US008511216B2

(12) United States Patent
Sasahara et al.

(10) Patent No.: US 8,511,216 B2
(45) Date of Patent: Aug. 20, 2013

(54) HYDRAULIC ACTUATOR UNIT

(75) Inventors: Kengo Sasahara, Amagasaki (JP);
Toshifumi Yasuda, Amagasaki (JP);
Minoru Kamada, Amagasaki (JP);
Masaaki Inoue, Amagasaki (JP);
Takashi Nishizawa, Amagasaki (JP);
Fumitoshi Ishino, Amagasaki (JP);
Masaya Itou, Amagasaki (JP); Shinichi Hirose, Amagasaki (JP); Jun Matsuura, Amagasaki (JP); Ryota Iwaibara, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 572 days.

(21) Appl. No.: 12/732,837

(22) Filed: Mar. 26, 2010

(65) Prior Publication Data
US 2011/0088545 A1    Apr. 21, 2011

Related U.S. Application Data

(60) Provisional application No. 61/164,764, filed on Mar. 30, 2009.

(51) Int. Cl.
F01B 3/00 (2006.01)
F01B 13/04 (2006.01)
(52) U.S. Cl.
USPC ............. 91/505; 417/212; 417/218; 417/269; 92/12.2; 60/484; 91/504; 91/506

(58) Field of Classification Search
USPC ................... 417/212, 218, 223, 269; 91/504, 91/505, 506; 92/12.2; 60/435, 484, 487
See application file for complete search history.

(56) References Cited

U.S. PATENT DOCUMENTS

| 6,425,244 | B1* | 7/2002 | Ohashi et al. | 60/464 |
| 6,672,843 | B1* | 1/2004 | Holder et al. | 417/201 |
| 7,229,256 | B1* | 6/2007 | Hauser et al. | 417/269 |
| 7,377,106 | B2* | 5/2008 | Sakikawa et al. | 60/486 |
| 7,458,311 | B2* | 12/2008 | Korthals | 92/12.2 |
| 7,806,667 | B1* | 10/2010 | Hauser et al. | 417/269 |
| 7,908,960 | B2* | 3/2011 | Daigre | 92/12.2 |
| 8,001,883 | B1* | 8/2011 | Langenfeld | 92/12.2 |
| 2003/0188909 | A1* | 10/2003 | Ohashi et al. | 180/300 |
| 2006/0272495 | A1* | 12/2006 | Ohashi | 91/472 |
| 2010/0199656 | A1* | 8/2010 | Ohashi | 60/484 |

* cited by examiner

Primary Examiner — Charles Freay
Assistant Examiner — Ryan Gatzemeyer
(74) Attorney, Agent, or Firm — Sterne, Kessler, Goldstein & Fox P.L.L.C.

(57) ABSTRACT

A hydraulic actuator unit includes a first electric motor assembly formed by mounting one of a pair of electric motors to one of a pair of electric motor covers, wherein the first electric motor assembly is detachably mounted to a pump case so as to rotate a first control shaft around its axis line, and a second electric motor assembly formed by mounting the other one of the pair of electric motors to the other one of the pair of electric motor covers, wherein the second electric motor assembly is detachably mounted to the pump case so as to rotate a second control shaft around its axis line.

10 Claims, 29 Drawing Sheets

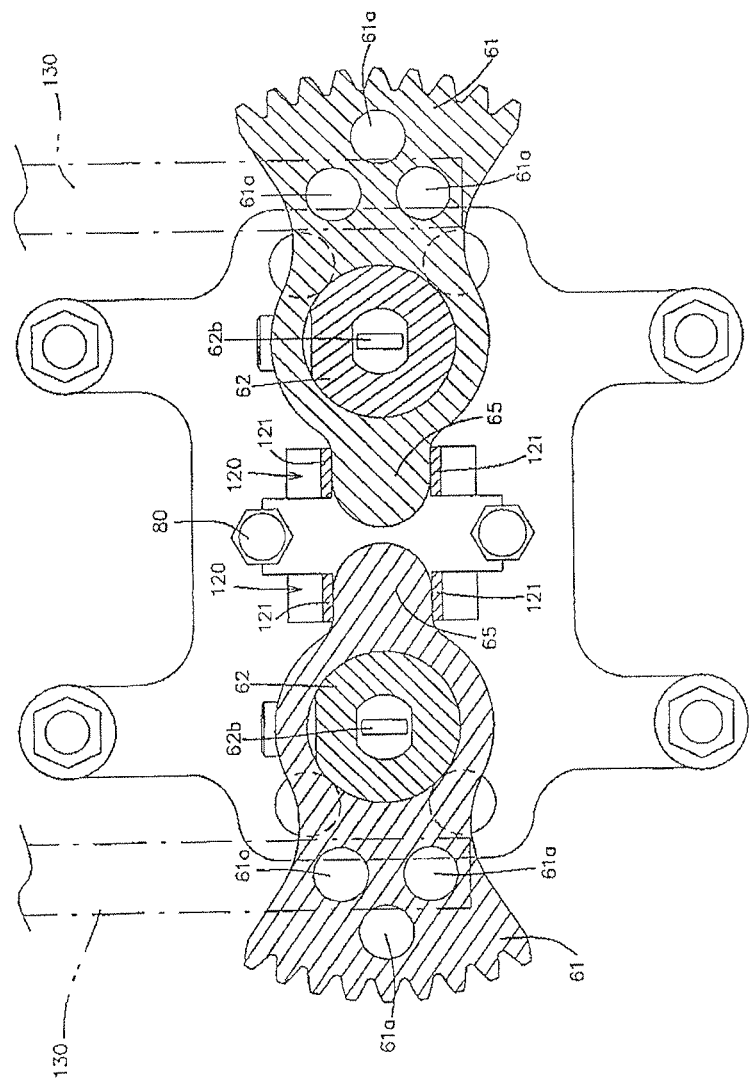

HYDRAULIC ACTUATOR UNIT

BACKGROUND OF THE INVENTION

1. Field of the Invention

The present invention relates to a hydraulic actuator unit including a hydraulic actuator such as a hydraulic pump main body, variable displacement mechanism for changing a displacement of the hydraulic actuator, and an electric motor for actuating the variable displacement mechanism.

2. Related Art

With regard to a hydraulic actuator unit such as a hydraulic pump unit or an HST unit, which includes a hydraulic actuator such as a hydraulic pump main body and a variable displacement mechanism for changing a displacement of the hydraulic actuator, there has been proposed a configuration in which the variable displacement mechanism is actuated with use of an electric motor (for example, US Patent Application Publication No. 2006-0272495).

The conventional hydraulic actuator unit is useful in that operation force required for actuating the variable displacement mechanism could be reduced, since the electric motor actuates the variable displacement mechanism so as to change the displacement of the hydraulic actuator.

However, the hydraulic actuator unit disclosed in the US patent application publication has following problems.

The US patent application publication discloses the hydraulic actuator unit in the form of hydraulic pump unit.

Specifically, the hydraulic actuator unit includes a pump case, first and second pump shafts, first and second hydraulic pump main bodies, first and second variable displacement mechanisms, and a pair of electric motors. The first and second pump shafts are supported by the pump case in a rotatable manner around their respective axis lines in a state of being parallel to each other and being operatively connected to each other. The first and second hydraulic pump main bodies are accommodated in the pump case in a state of being supported by the first and second pump shafts in a relatively non-rotatable manner with respect thereto. The first and second variable displacement mechanisms change displacements of the first and second hydraulic pump main bodies, respectively. The pair of electric motors actuate the first and second displacement mechanisms, respectively.

The first pump shaft has first and second ends that are positioned on one side and the other side in its axis line direction, the first end being extended outward from the pump case to form an input end to be operatively connected to a driving power source. The second pump shaft has first and second ends that are positioned on the same side as the first and second ends of the first pump shaft with respect to the axis line direction, respectively, the second end being extended outward from the pump case to drive a cooling fan.

The first variable displacement mechanism includes a control shaft (hereinafter referred to as first control shaft) that is supported by the pump case in a rotatable manner around its axis line in a state where its first end is inserted into the pump case so as to be operatively connected to a corresponding variable swash plate and its second end is extended outward from the pump case.

The second variable displacement mechanism includes a control shaft (hereinafter referred to as second control shaft) that is supported by the pump case in a rotatable manner around its axis line and in parallel with the first control shaft in a state where its first and second ends are faced in the same direction as the first and second ends of the first control shaft. The first end is operatively connected to a corresponding swash plate, and the second end is extended outward from the pump case.

One (hereinafter referred to as first electric motor) of the pair of electric motors is mounted to the pump case via an electric motor cover (hereinafter referred to as first electric motor cover) so as to rotate the second end of the first control shaft around the axis line, while the other one (hereinafter referred to as second electric motor) of the pair of electric motors is mounted to the pump case via an electric motor cover (hereinafter referred to as second electric motor cover) so as to rotate the second end of the second control shaft around the axis line.

Specifically, the first electric motor cover supports the first electric motor so that an electric motor main body of the first electric motor is positioned on an opposite side to the first end of the first pump shaft with respect to a first virtual surface that passes through axis lines of the first and second control shafts.

On the other hand, the second electric motor cover is symmetrical to the first electric motor cover with respect to a second virtual plane that is orthogonal to the first virtual plane and passes through a center between the first and second control shafts. Specifically, the second electric motor cover supports the second electric motor so that an electric motor main body of the second electric motor is positioned on the same side as the second end of the second pump shaft with respect to the first virtual plane.

In the conventional hydraulic actuator unit with the configuration, the cooling fan has to be away from the pump case in such a manner as that the cooling fan, which is mounted on the second end of the second pump shaft, is not interfered with the second electric motor, resulting in an enlargement of the hydraulic actuator unit as a whole.

Moreover, as explained above, the first and second electric motor covers are symmetrical to each other with respect to the second virtual plane. Specifically, in the conventional hydraulic actuator unit, the first electric motor cover is exclusively used for mounting the first electric motor and the second electric motor cover is exclusively used for mounting the second electric motor, rather than the first and second electric motor covers have the same configuration to each other.

Accordingly, in the conventional hydraulic actuator unit, it is likely to cause a mistake in assembling work of the first and second electric motors to the pump case, resulting in worsened assembling workability of the first and second electric motors while involving complicated inventory management of the first and second electric motor covers.

Furthermore, the conventional hydraulic actuator unit does not take into account cases where the variable displacement mechanism needs to be manually operated upon breakdown or mode change of the electric motor. Therefore, the conventional hydraulic actuator unit has difficulties in changing modes between the electric mode of actuating the variable displacement mechanism with use of the electric motor and the manual mode of manually actuating the variable displacement mechanism.

SUMMARY OF THE INVENTION

The present invention is made in view of the prior art, and it is a first object to provide a hydraulic actuator unit including a pump case, first and second pump shafts that are supported by the pump case in a rotatable manner around respective axis lines in a state of being positioned in parallel to each other and being operatively connected to each other, first and second hydraulic pump main bodies that are accommodated in the pump case in a state of being supported by the first and second pump shafts respectively in a relatively non-rotatable manner with respect thereto, first and second variable displacement mechanisms that change displacements of the first and second hydraulic pump main bodies, respectively, and first and second electric motors that actuate the first and second variable displacement mechanisms, respectively, wherein the first pump shaft has a first end extended outward from the pump case so as to be operatively connected to a driving power source and a second end on an opposite side to the first end, and wherein the second pump shaft has first and second ends that are positioned on the same side as the first and second ends of the first pump shaft in the axis line direction, the second end being extended outward from the pump case to drive a cooling fan, the hydraulic actuator unit capable of being miniaturized as a whole while achieving common use of components as much as possible.

In order to achieve the first object, the present invention provides a hydraulic actuator unit including a pump case, first and second pump shafts that are supported by the pump case in a rotatable manner around respective axis lines in a state of being positioned in parallel to each other and being operatively connected to each other, first and second hydraulic pump main bodies that are accommodated in the pump case in a state of being supported by the first and second pump shafts respectively in a relatively non-rotatable manner with respect thereto, first and second variable displacement mechanisms that change displacements of the first and second hydraulic pump main bodies, respectively, and first and second electric motors that actuate the first and second variable displacement mechanisms, respectively, the hydraulic actuator unit being characterized in that the first pump shaft has first and second ends positioned on one and the other sides in its axis line direction, the first end being extended outward from the pump case to form an input end that is operatively connected to a driving power source, the second pump shaft has first and second ends that are positioned on the same side as the first and second ends of the first pump shaft in the axis line direction, the second end being extended outward from the pump case to drive a cooling fan, the first and second variable displacement mechanisms include first and second movable swash plates each of which changes a displacement of the corresponding hydraulic pump main body in accordance with its slanting position around a swing axis line, and first and second control shafts each of which is supported by the pump case in a rotatable manner around its axis line, each of the first and second control shafts has a first end operatively connected to the corresponding movable swash plate in such a manner as to slant the movable swash plate in accordance with its rotation around the axis line and a second end extended outward from the pump case, the first and second control shafts are supported by the pump case in such a manner as that they are orthogonal to the first and second pump shafts and their second ends are faced in the same direction to each other, each of the pair of electric motors has an electric motor main body that is controlled and driven based on an external electric signal, an electric motor output mechanism that is operatively connected to an output shaft of the electric motor main body, and an electric motor case that supports the electric motor main body and the electric motor output mechanism, the hydraulic actuator unit further includes a pair of electric motor covers for connecting the pair of electric motors to the pump case, one of the pair of electric motors is mounted to one of the pair of electric motor covers to form a first electric motor assembly that is detachably mounted to the pump case so as to rotate the first control shaft around the axis line, the other one of the pair of electric motors is mounted to the other one of the pair of electric motor covers to form a second electric motor assembly that is detachably mounted to the pump case so as to rotate the second control shaft around the axis line, the first electric motor assembly is mounted to the pump case so that the corresponding electric motor has a rotational axis line in parallel with the first pump shaft in a state where the electric motor is positioned on an opposite side to the second control shaft with respect to the first control shaft and is also positioned on an opposite side to the first end of the first pump shaft with respect to a virtual plane that passes through the axis lines of the first and second control shafts, and the second electric motor assembly is mounted to the pump case at a posture obtained by rotating the first electric motor assembly by 180 degrees about a virtual center line that is disposed in parallel with the first and second control shafts and is located at a center between the first and second control shafts, thereby the electric motor of the second electric motor assembly is positioned on an opposite side to the cooling fan with respect to the virtual plane.

The hydraulic actuator unit according to the present invention makes it possible to mount the first electric motor assembly to the pump case while preventing the first electric motor assembly from being interfered with a transmission mechanism transmitting rotational power from the driving power source to the first end of the first pump shaft without elongating a length of a portion of the first end of the first pump shaft that is extended outward from the pump case. The hydraulic actuator unit makes it also possible to mount the second electric motor assembly to the pump case while preventing the second electric motor assembly from being interfered with the cooling fan supported by the second end of the second pump shaft without elongating a length of a portion of the second end of the second pump shaft that is extended outward from the pump case. Accordingly, the hydraulic actuator unit could be reduced in size as a whole.

Further, in the hydraulic actuator unit according to the present invention, the first and second electric motor assemblies have the same configuration to each other. Accordingly, it is possible to enhance assembling workability and simplify inventory management thanks to common use of components.

Preferably, the hydraulic actuator unit according to the present invention further includes a pair of first spring pieces for holding the first control shaft at a neutral position around the axis line, a first engagement arm that is directly or indirectly supported by the first control shaft in a relatively non-rotatable manner with respect thereto so as to be sandwiched by the pair of first spring pieces, a pair of second spring pieces for holding the second control shaft at a neutral position around the axis line, and a second engagement arm that is directly or indirectly supported by the second control shaft in a relatively non-rotatable manner with respect thereto so as to be sandwiched by the pair of second spring pieces, wherein the electric motor cover is provided with a prevention arm that pushes the corresponding pair of spring pieces apart from each other so that the corresponding engagement arm receives no influence from the pair of spring pieces upon mounting of the electric motor cover to the pump case.

The hydraulic actuator unit with the preferable configuration makes it possible to obtain neutral-returning/neutral-holding function for returning the variable displacement mechanism to its neutral state and holding the same at the neutral state by the pair of spring pieces in the manual mode in which the electric motor assembly is detached from the pump case and the variable displacement mechanism is manually operated while effectively preventing the biasing force of the pair of spring pieces from acting on the electric motor as load in the electric mode in which the electric motor assembly is mounted to the pump case and the variable displacement mechanism is operated by the electric motor. Accordingly, it is possible to selectively realize the manual mode with the neutral-returning/neutral-holding function by the pair of spring pieces or the electric mode in which unnecessary load on the electric motor by the pair of spring pieces is prevented, only by mounting or detaching the electric motor assembly to or from the pump case.

Preferably, the pair of first spring pieces and the pair of second spring pieces are directly or indirectly mounted to the pump case so as to be positioned between the first and second control shafts.

The configuration makes it possible that the first and second spring pieces are provided without enlarging the hydraulic actuator unit.

More specifically, the hydraulic actuator unit further includes a pair of sector gears that are directly or indirectly supported by the corresponding control shafts in a relatively non-rotatable manner with respect thereto and are engaged with the corresponding electric motor output gears, the engagement arm being integrally formed with a member forming the corresponding sector gear.

More preferably, the electric motor output mechanism may have a worm shaft that is operatively connected to the output shaft of the electric motor main body, a worm wheel that is engaged with the worm shaft, an electric motor output shaft that is supported by the electric motor case in a rotatable manner about its axis line and supports the worm wheel in a relatively non-rotatable manner with respect thereto, and an electric motor output gear that is supported by the electric motor output shaft in a relatively non-rotatable manner with respect thereto.

The preferable configuration makes it possible to allow the electric motor output gear to be rotated upon rotation of the electric motor main body while preventing unintentional rotation of the electric motor output gear, that is unintentional rotation of the control shaft, at the time when the electric motor main body is in a non-operated state.

In place of or in addition to the configuration, each of the electric motors may be provided with a clutch structure that has a reverse-rotation preventing function of preventing the electric motor main body from being rotated by power applied from the electric motor output gear of the electric motor output mechanism while allowing the electric motor output gear to be rotated upon rotation of the electric motor main body.

The configuration with the clutch structure makes it also possible to prevent unintentional rotation of the electric motor output gear, that is unintentional rotation of the control shaft, at the time when the electric motor main body is in the non-operated state.

A second object of the present invention is to provide a hydraulic actuator unit including a pump case, a pump shaft that is supported by the pump case in a rotatable manner around its axis line, a hydraulic pump main body that is accommodated in the pump case in a state of being supported by the pump shaft in a relatively non-rotatable manner with respect thereto, a variable displacement mechanism that changes a displacement of the hydraulic pump main body, and a electric motor that actuates the variable displacement mechanism, the hydraulic actuator unit capable of obtaining neutral-returning/neutral-holding function for returning the variable displacement mechanism to its neutral state and holding the same at the neutral state by a pair of spring pieces in the manual mode in which the electric motor is detached and the variable displacement mechanism is manually operated while effectively preventing the biasing force of the pair of spring pieces from acting on the electric motor as load in the electric mode in which the electric motor is mounted to the pump case and the variable displacement mechanism is operated by the electric motor.

In order to achieve the second object, the present invention provides a hydraulic actuator unit including a pump case, a pump shaft that is supported by the pump case in a rotatable manner around its axis line, a hydraulic pump main body that is accommodated in the pump case in a state of being supported by the pump shaft in a relatively non-rotatable manner with respect thereto, a variable displacement mechanism that changes a displacement of the hydraulic pump main body, and a electric motor that actuates the variable displacement mechanism, the hydraulic actuator unit further including an electric cover to which the electric motor is mounted and which is detachably connected to the pump case with the electric motor being mounted thereto, a motor transmission mechanism that operatively connects an electric motor output gear of the electric motor to a control shaft of the variable displacement mechanism upon mounting of an electric motor assembly, which is formed by the electric motor and the electric motor cover, to the pump case, a pair of spring pieces that hold the control shaft at a neutral position around its axis line, and an engagement arm that is directly or indirectly supported by the control shaft in a relatively non-rotatable manner with respect thereto so as to be sandwiched by the pair of spring pieces, wherein the electric motor cover is provided with a prevention arm that pushes the pair of spring pieces apart from each other so that the engagement arm receives no influence from the pair of spring pieces upon mounting of the electric motor cover to the pump case.

The hydraulic actuator unit according to the present invention makes it possible to obtain neutral-returning/neutral-holding function for returning the variable displacement mechanism to its neutral state and holding the same at the neutral state by the pair of spring pieces in the manual mode in which the electric motor assembly is detached and the variable displacement mechanism is manually operated while effectively preventing the biasing force of the pair of spring pieces from acting on the electric motor as load in the electric mode in which the electric motor assembly is mounted to the pump case and the variable displacement mechanism is operated by the electric motor.

In one embodiment, the pump shaft includes first and second pump shafts that are arranged in parallel with each other and are operatively connected to each other, the hydraulic pump main body includes first and second hydraulic pump main bodies that are supported by the first and second pump shafts respectively in a relatively non-rotatable manner with respect thereto, the variable displacement mechanism includes first and second variable displacement mechanisms that change displacements of the first and second hydraulic pump main bodies, respectively, the electric motor includes first and second electric motors that have the same configuration to each other and actuate the first and second variable displacement mechanisms, respectively, the electric motor cover includes first and second electric motor covers that have the same configuration to each other and form first and second electric motor assemblies in cooperation with the first and second electric motors, respectively, the motor transmission mechanism includes first and second motor transmission mechanisms that have the same configuration to each other and operatively connect the electric motor output gears of the corresponding electric motors to the corresponding control shafts, respectively, the pair of spring pieces includes a pair of first spring pieces that hold a first control shaft of the first variable displacement mechanism at a neutral position around its axis line and a pair of second spring pieces that hold a second control shaft of the second variable displacement mechanism at a neutral position around its axis line, the engagement arm includes a first engagement arm that is directly or indirectly supported by the first control shaft in a relatively non-rotatable manner with respect thereto so as to be sandwiched by the pair of first spring pieces and a second engagement arm that is directly or indirectly supported by the second control shaft in a relatively non-rotatable manner with respect thereto so as to be sandwiched by the pair of second spring pieces, and the prevention arm includes a first prevention arm that is provided at the first electric motor cover so as to push the pair of first spring pieces apart from each other so that the first engagement arm receives no influence from the pair of first spring pieces upon mounting of the first electric motor cover to the pump case and a second prevention arm that is provided at the second electric motor cover so as to push the pair of second spring pieces apart from each other so that the second engagement arm receives no influence from the pair of second spring pieces upon mounting of the second electric motor cover to the pump case, wherein the first and second control shafts are supported by the pump case in a rotatable manner around the respective axis lines in a state where they are parallel to each other and their ends that are operatively connected to the corresponding electric motors face in the same direction to each other, wherein the first electric motor cover supports the first electric motor so as to be positioned on an opposite side to the second control shaft with respect to the first control shaft, wherein the second electric motor cover supports the second electric motor so as to be positioned on an opposite side to the first control shaft with respect to the second control shaft, and wherein the pair of first spring pieces and the pair of second spring pieces are positioned between the first and second control shafts.

The configuration makes it possible to reduce a size of the hydraulic actuator unit with the pair of first spring pieces and the pair of second spring pieces as much as possible.

Preferably, each of the first and second electric motors has an electric motor main body that is controlled and driven based on an external electric signal, an electric motor output mechanism that is operatively connected to an output shaft of the electric motor main body, and an electric motor case that supports the electric motor main body and the electric motor output mechanism, wherein the electric motor output mechanism has a worm shaft that is operatively connected to the output shaft of the electric motor main body, a worm wheel that is engaged with the worm shaft, an electric motor output shaft that is supported by the electric motor case in a rotatable manner about its axis line and supports the worm wheel in a relatively non-rotatable manner with respect thereto, and an electric motor output gear that is supported by the electric motor output shaft in a relatively non-rotatable manner with respect thereto and is operatively connected to the motor transmission mechanism.

The preferable configuration makes it possible to allow the electric motor output gear to be rotated upon rotation of the electric motor main body while preventing unintentional rotation of the electric motor output gear, that is unintentional rotation of the control shaft, at the time when the electric motor main body is in a non-operated state.

In place of or in addition to the configuration, each of the first and second electric motors may have an electric motor main body that is controlled and driven based on an external electric signal, an electric motor output mechanism that is operatively connected to an output shaft of the electric motor main body, an electric motor case that supports the electric motor main body and the electric motor output mechanism, and a clutch structure that has a reverse-rotation preventing function of preventing the electric motor main body from being rotated by power applied from the electric motor output gear of the electric motor output mechanism while allowing the electric motor output gear to be rotated in accordance with rotation of the electric motor main body.

The provision of the clutch structure makes it also possible to prevent unintentional rotation of the electric motor output gear, that is unintentional rotation of the control shaft, at the time when the electric motor main body is in a non-operated state.

BRIEF DESCRIPTION OF THE DRAWINGS

FIG. 7A shows a state where an electric motor cover of the hydraulic actuator unit is being attached a pump case, and FIG. 7B shows a state where the electric motor cover has been attached to the pump case.

FIG. 8 is a cross sectional view taken along line III-III in FIG. 2 with the electric motor covers being detached.

DETAILED DESCRIPTION OF THE PREFERRED EMBODIMENTS

First Embodiment

Hereinafter, a preferred embodiment of a hydraulic actuator unit according to the present application will be explained with reference to the accompanying drawings.

Figure 1:
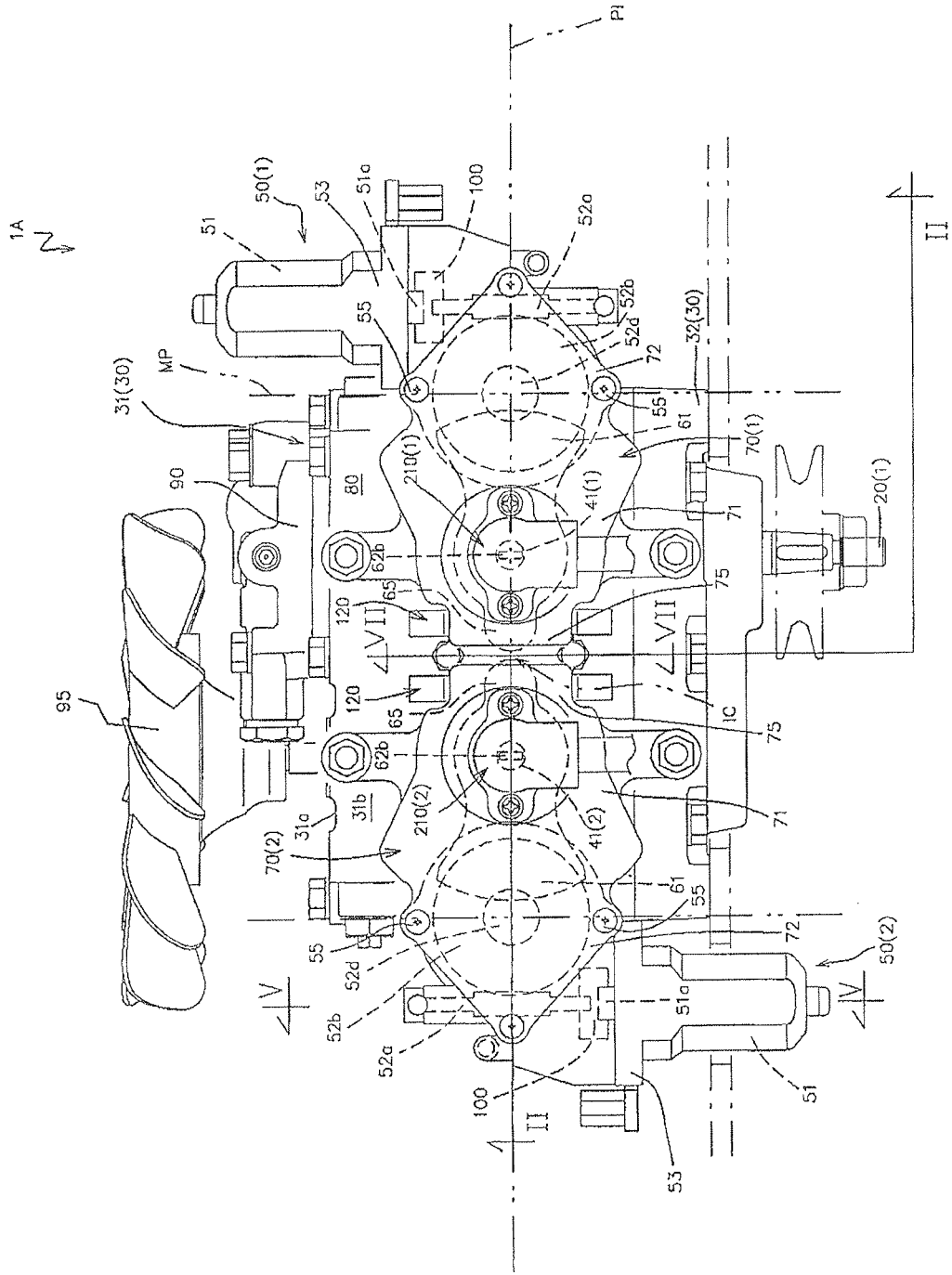
FIG. 1 is a front view of a hydraulic actuator unit according to a first embodiment of the present invention.

FIG. 1 is a front view of a hydraulic actuator unit 1A according to the present embodiment.

Figure 2:
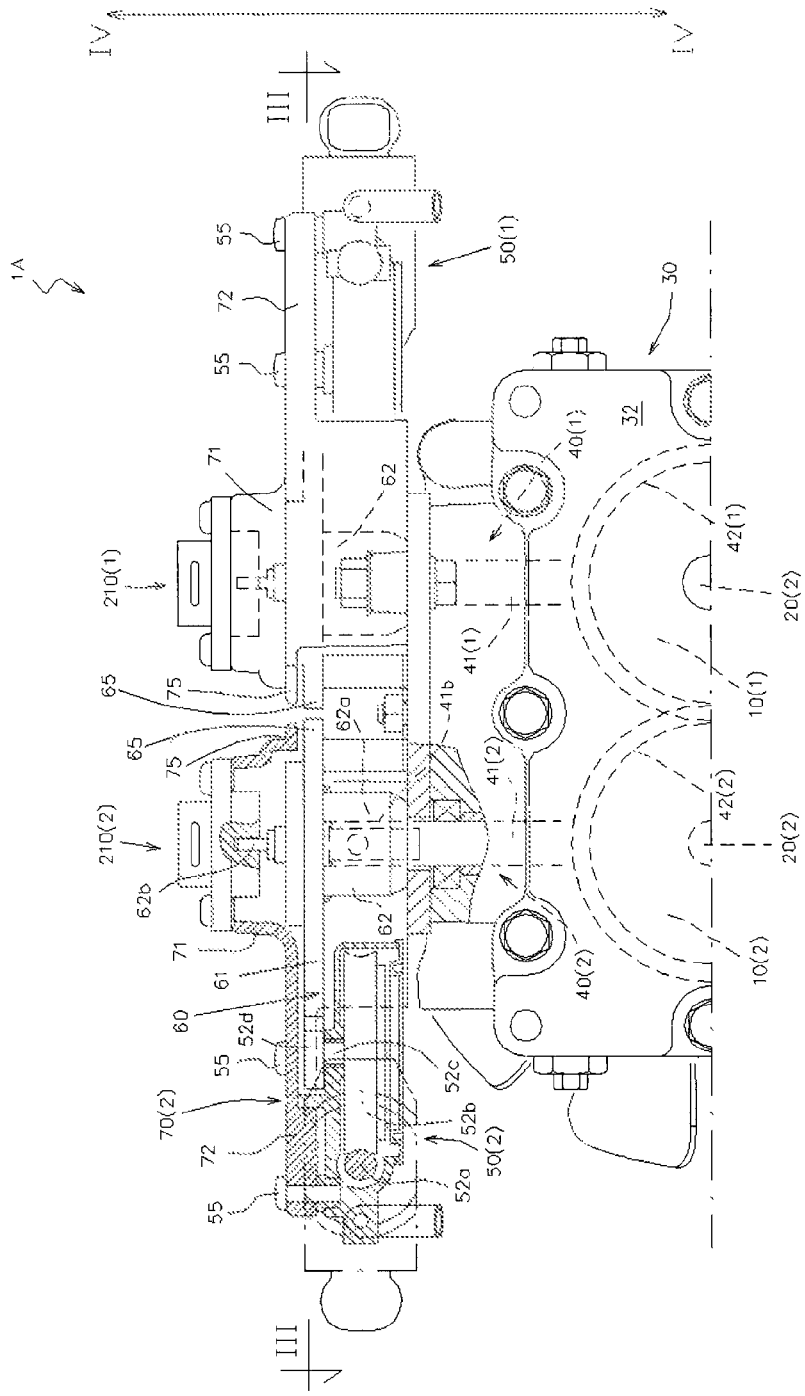
FIG. 2 is a cross sectional view taken along line II-II in FIG. 1.
Figure 3:
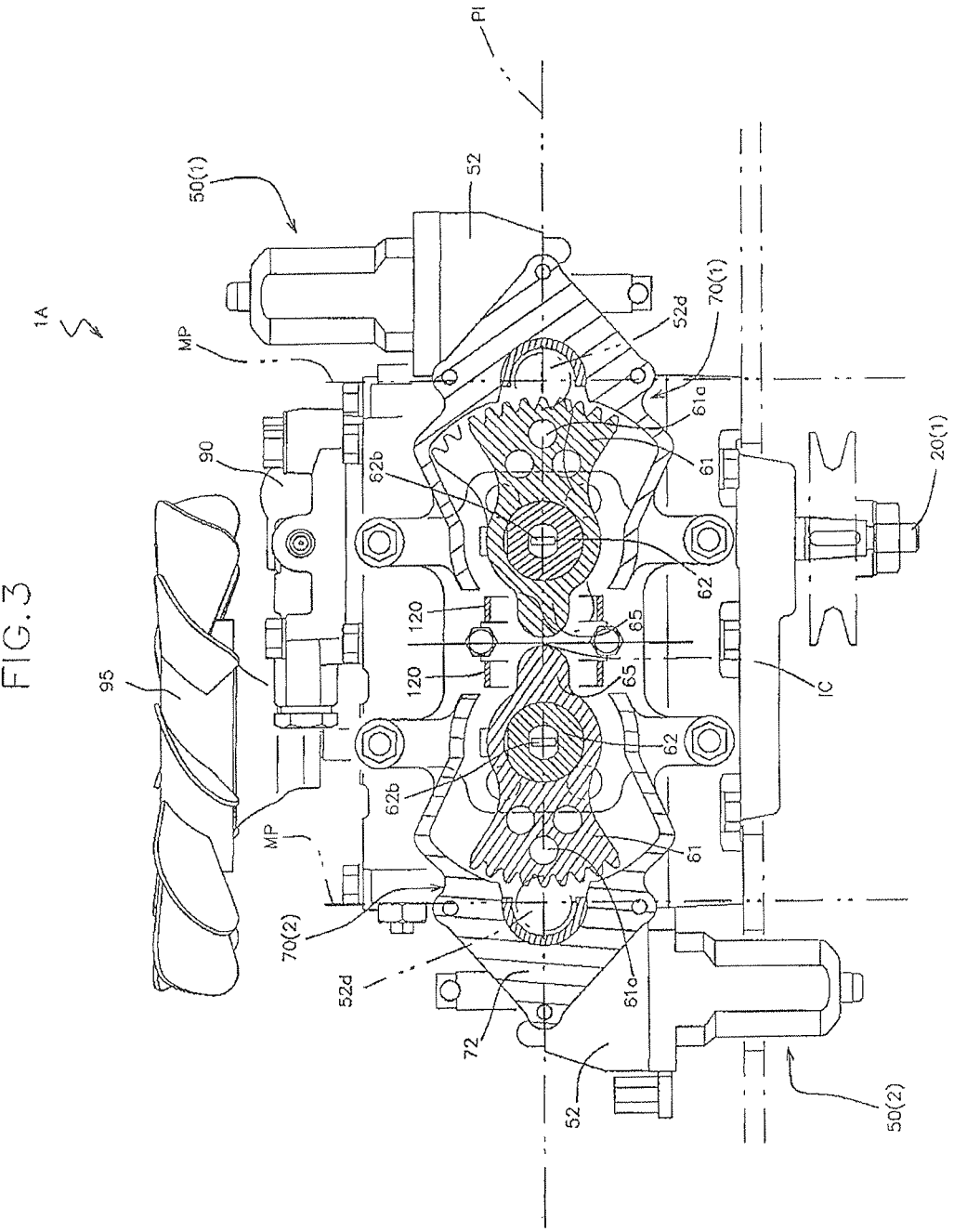
FIG. 3 is a cross sectional view taken along line III-III in FIG. 2.

FIGS. 2 and 3 are cross sectional views taken along line II-II in FIG. 1 and line III-III in FIG. 2, respectively.

Figure 4:
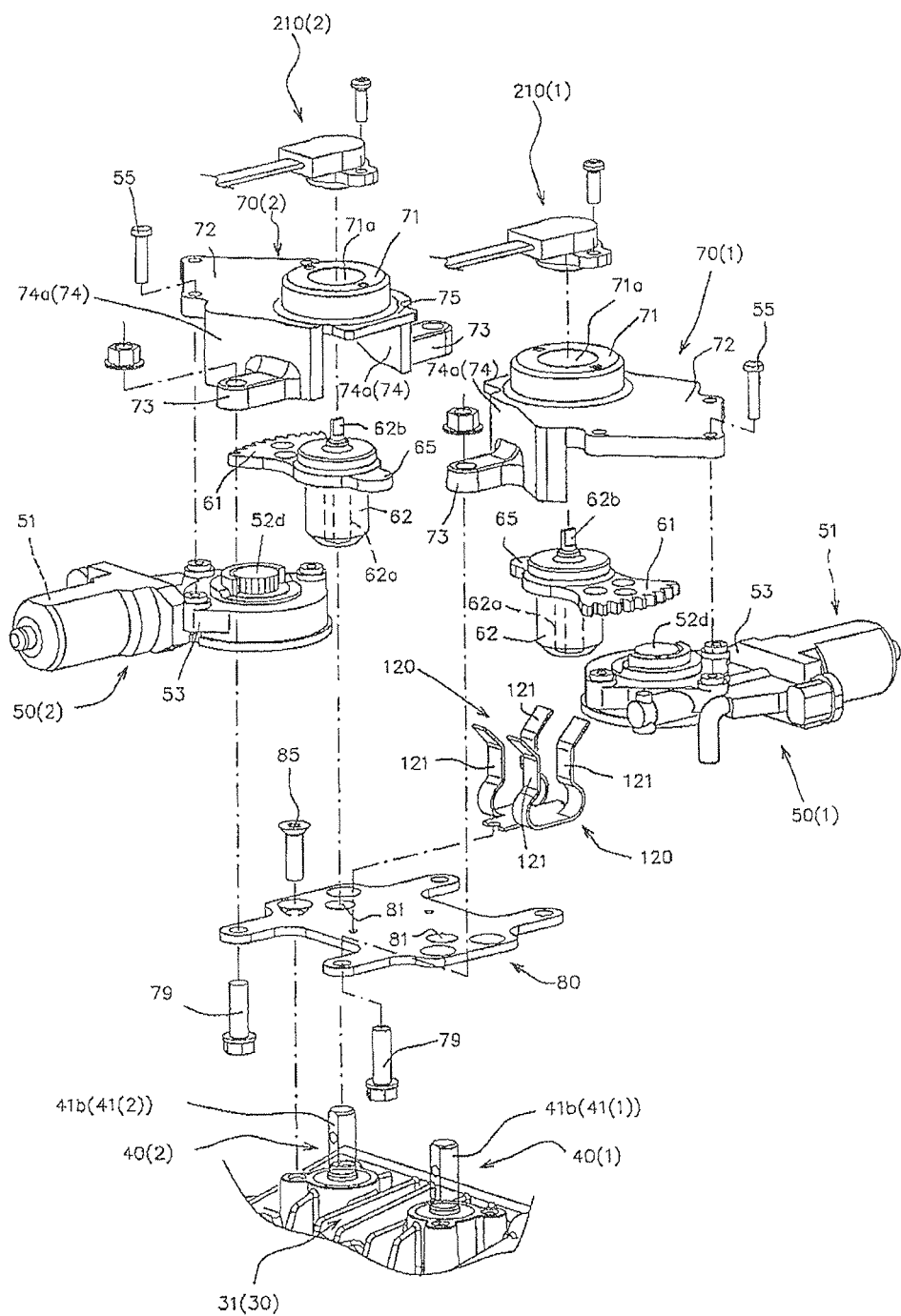
FIG. 4 is an exploded perspective view of the hydraulic actuator unit taken along line IV-IV in FIG. 2.

Further, FIG. 4 is an exploded perspective view of the hydraulic actuator unit 1A taken along line IV-IV in FIG. 2.

The hydraulic actuator unit 1A includes a rotary shaft, a hydraulic actuator that is supported by the rotary shaft in a relatively non-rotatable manner with respect thereto, a variable displacement mechanism 40 that changes the displacement of the hydraulic actuator, and an electric motor 50 that actuates the variable displacement mechanism 40.

As shown in FIGS. 1 to 3, the hydraulic actuator unit 1A according to the present embodiment is formed as a hydraulic pump unit that includes first and second hydraulic pump main bodies 10(1) and 10(2) each functioning as the hydraulic actuator.

Specifically, as shown in FIGS. 1 to 4, the hydraulic actuator unit according to the present embodiment includes first and second pump shafts 20(1) and 20(2) each of which functions as the rotary shaft and that are operatively connected to a driving power source (not shown) in a state of being disposed in parallel to each other, the first and second hydraulic pump main bodies 10(1) and 10(2) that are supported by the first and second pump shafts 20(1) and 20(2) in a relatively non-rotatable manner, respectively, and a pump case 30 that accommodates the first and second hydraulic pump main bodies 10(1) and 10(2) and also supports the first and second pump shafts 20(1) and 20(2) in a rotatable manner around respective axis lines.

The hydraulic actuator unit 1A is configured such that the displacements of the first and second hydraulic pump main bodies 10(1) and 10(2) can be changed independently from each other.

More specifically, the hydraulic actuator unit 1A includes a pair of variable displacement mechanisms 40 that are each configured identically with the variable displacement mechanism 40 described earlier and change the displacements of the first and second hydraulic pump main bodies 10(1) and 10(2), respectively, and a pair of electric motors 50 that are each configured identically with the electric motor 50 described earlier and actuate the pair of variable displacement mechanisms 40, respectively.

In the present specification, where appropriate, the variable displacement mechanisms 40 will be distinctively referred to as a first variable displacement mechanism 40(1) and a second variable displacement mechanism 40(2), which change the displacements of the first hydraulic pump main body 10(1) and the second hydraulic pump main body 10(2), respectively.

Moreover, where appropriate in the present specification, the electric motors 50 will be distinctively referred to as a first electric motor 50(1) and a second electric motor 50(2), which actuate the first variable displacement mechanism 40(1) and the second variable displacement mechanism 40(2), respectively.

In the present embodiment, as shown in FIGS. 1 and 3, one pump shaft (for example, the first pump shaft 20(1)) of the first and second pump shafts 20(1) and 20(2) has a first end extending outward from the pump case 30 to form an input end capable of being operatively connected to the driving power source.

The other one pump shaft (for example, the second pump shaft 20(2)) of the first and second pump shafts 20(1) and 20(2) is operatively connected to the one pump shaft trough a power transmission gear mechanism (not shown) accommodated in the pump case 30.

Preferably, at least one of a second end of the one pump shaft that is opposite from the first end and a end of the other one pump shaft that is positioned on the same side as the second end of the one pump shaft is extended outward from the pump case 30 to form an outward-extended end. The hydraulic actuator unit A is provided with a charge pump unit 90 driven by the outer-extended end.

In the present embodiment, as shown in FIG. 3, the first pump shaft 20(1) functioning as the one pump shaft has the second end that is extended outward from the pump case 30, and the second pump shaft 20(2) functioning as the other one pump shaft has the end that is positioned on the same side as the second end of the firs pump shaft 20(1) and is extended outward from the pump case 30 to form the outward-extended end, so that the second end of the first pump shaft 20(1) drives the charge pump 90 and the outward-extended end of the second pump shaft 20(2) drive a cooling fan 95.

As explained above, the hydraulic actuator unit according to the present embodiment is in form of the hydraulic pump unit including the first and second hydraulic pump main bodies 10(1) and 10(2), and is configured so as to suction and discharge operational fluid from/to first and second motor main bodies (not shown) trough a pair of first HST lines (not shown) and a pair of second HST lines (not shown), respectively.

Specifically, the pump case 30 is formed with a pair of first pump-side operational fluid passages (not shown) and a pair of second pump-side operational fluid passages (not shown) that form a part of the pair of first HST lines and a part of the pair of second HST lines, respectively.

The pair of first pump-side operational fluid passages have first ends fluidly connected to the first hydraulic pump main body 10(1) and second ends opened to an outer surface to form a pair of first pump-side operational fluid ports (not shown).

The pair of second pump-side operational fluid passages have first ends fluidly connected to the second hydraulic pump main body 10(2) and second ends opened to the outer surface to form a pair of second pump-side operational fluid ports (not shown).

A pair of first external conduits (not shown) forming a part of the first HST lines are fluidly connected to the pair of first pump-side operational fluid passages, respectively. That is, the first hydraulic pump main body 10(1) is fluidly connected to the cooperating hydraulic motor main body (for example, the first hydraulic motor main body operatively driving one of the pair of driving wheels in the working vehicle) through the pair of first pump-side operational fluid passages and the pair of first external conduits.

Similarly, a pair of second external conduits (not shown) forming a part of the second HST lines are fluidly connected to the pair of second pump-side operational fluid passages, respectively. That is, the second hydraulic pump main body 10(2) is fluidly connected to the cooperating hydraulic motor main body (for example, the second hydraulic motor main body operatively driving the other one of the pair of driving wheels in the working vehicle) through the pair of second pump-side operational fluid passages and the pair of second external conduits.

In the present embodiment, as shown in FIGS. 1 to 3, the pump case 30 includes a pump case body 31 and a port block 32 that are detachably connected to each other in the axis lines of the first and second pump shafts 20(1) and 20(2).

The pump case body 31 has a hollow shape including an end wall 31a that is positioned on one side in the axis line direction of the first and second pump shafts 20(1) and 20(2) and is extended in a direction orthogonal to the first and second pump shafts 20(1) and 20(2), a peripheral wall 31b that is extended toward the other side in the axis line direction of the first and second pump shafts 20(1) and 20(2) from a peripheral edge of the end wall 31a, and an opening (not shown) that is provided at the other side of the peripheral wall 31b in the axis line direction of the first and second pump shafts 20(1) and 20(2) and has a size allowing the first and second hydraulic pump main bodies 10(1) and 10(2) to be passed therethrough.

The port block 32 is detachably connected to the pump case body 31 so as to close the opening to form a pump space for accommodating the first and second hydraulic pump main bodies 10(1) and 10(2).

That is, the first and second hydraulic pump main bodies 10(1) and 10(2) are accommodated in the pump space defined by the pump case body 31 and the port block 32 in a state of being supported by the corresponding pump shafts 20(1) and 20(2) in a relatively non-rotatable manner with respect thereto.

The first and second hydraulic pump main bodies 10(1) and 10(2) are configured identically with each other. Thus, where appropriate in the following description, the first and second hydraulic pump main bodies 10(1) and 10(2) will be each referred to simply as the hydraulic pump main body 10.

The hydraulic pump main bodies 10 may be variously embodied such as of the axial piston type or of the radial piston type, as far as each of which is capable of supplying/exhausting hydraulic fluid in accordance with rotation of corresponding one of the pump shafts 20(1) and 20(2).

In the present embodiment, the hydraulic pump main body is of an axial piston type.

Specifically, the hydraulic pump main body includes a cylinder block (not shown) supported by the corresponding pump shaft 20(1) or 20(2), and a plurality of pistons (not shown) accommodated in the cylinder block in a relatively non-rotatable manner around the corresponding pump shaft and in a relatively movable manner along the axis line direction of the corresponding pump shaft with respect to the cylinder block.

Each of the variable displacement mechanisms 40 is capable of changing, in response to external operation, the displacement of corresponding one of the hydraulic pump main bodies 10, namely, the volume and the direction of hydraulic fluid to be sucked/discharged by the corresponding hydraulic pump main body 10.

More specifically, the variable displacement mechanism 40 is configured to be brought into a neutral state, a normal-rotation output state, and a reverse-rotation output state. In the neutral state, the suction/discharge amount of the corresponding hydraulic pump main body 10 is made substantially equal to zero to cause the output from the cooperating hydraulic motor main body to be zero. In the normal-rotation output state, the corresponding hydraulic pump main body 10 sucks hydraulic fluid from a first one of the corresponding HST lines and discharges to a second one of the HST lines so as to rotate the hydraulic motor main body in the normal-rotation direction. In the reverse-rotation output state, the corresponding hydraulic pump main body 10 sucks hydraulic fluid from the second one of the HST lines and discharges to the first one of the HST lines so as to rotate the hydraulic motor main body in the reverse-rotation direction.

As described above, in the present embodiment, the hydraulic pump main body is of the axial piston type.

Thus, as shown in FIGS. 1 to 4, in the present embodiment, the variable displacement mechanisms 40 each include a movable swash plate 42 (42(1) and 42(2), respectively) which is capable of changing the reciprocation range of the pistons in the corresponding hydraulic pump main body 10 in accordance with the slanting position thereof around the swing axis line, and a control shaft 41 that is supported by the pump case 30 in a rotatable manner around its axis line so as to cause the movable swash plate 42 to be slanted in accordance with rotation of the control shaft 41 around the axis line.

More specifically, each of the movable swash plates 42 can be slanted between a normal-rotation-outputting-side maximum slanting position on one side around the swing axis line and a reverse-rotation-outputting-side maximum slanting position on the other side around the swing axis line.

Each of the control shafts 41 is supported by the pump case 30 in a rotatable manner around its axis line, with a first end being located in the pump case 30 so as to be operatively connected with corresponding one of the movable swash plates 42 and a second end 41b being extended outward from the pump case 30 so as to be externally operated.

As shown in FIGS. 1 to 4, in the present embodiment, the control shafts 41 of the pair of variable displacement mechanisms 40 are supported by the pump case 30 so as to be parallel to each other with the second ends 41b being extended outward from an identical side surface of the pump case 30.

As shown in FIG. 1, the electric motors 50 each have an electric motor main body 51 that is controlled and driven based on an external electric signal, an electric motor output mechanism 52 that is operatively connected to an output shaft 51a of the electric motor main body 51, and an electric motor case 53 that accommodates the electric motor main body 51 and the electric motor output mechanism 52.

As shown in FIGS. 1 to 4, each of the electric motor output mechanisms 52 is operatively connected to corresponding one of the control shafts 41 via a motor transmission mechanism 60.

In other words, the hydraulic actuator unit 1A according to the present embodiment includes, in addition to the components recited above, a pair of the motor transmission mechanisms 60 each of which transmits, to corresponding one of the pair of variable displacement mechanisms 40, rotational power generated by corresponding one of the pair of electric motors 50.

More specifically, as shown in FIGS. 1 to 4, the electric motor output mechanism 52 has a worm shaft 52a that is operatively connected to the output shaft 51a of the electric motor main body 51, a worm wheel 52b that is engaged with the worm shaft 52a, an electric motor output shaft 52c that is supported by the electric motor case 53 in a rotatable manner about its axis line and supports the worm wheel 52b in a relatively non-rotatable manner with respect thereto, and an electric motor output gear 52d that is supported by the electric motor output shaft 52c in a relatively non-rotatable manner with respect thereto.

The electric motor output gear 52d preferably has a radius smaller than that of the worm wheel 52b.

Each of the motor transmission mechanisms 60 includes a sector gear 61 that is engaged with the electric motor output gear 52d, and an operation shaft 62 that supports the sector gear 61 in a relatively non-rotatable manner with respect thereto. The operation shaft 62 is connected to corresponding one of the control shafts 41 so as to be relatively non-rotatable around its axis line with respect thereto.

In the present embodiment, the operation shaft 62 has a hollow portion 62a that allows the second end 41b of the corresponding control shaft 41 to be inserted thereinto. The operation shaft 62 is connected by means of a bolt to the control shaft 41 so as to be relatively non-rotatable with respect thereto in a state where the second end 41b of the control shaft 41 is inserted into the hollow portion 62a.

The hydraulic actuator unit 1A according to the present embodiment further includes a pair of electric motor covers 70 each of which allows corresponding one of the electric motors 50 to be detachably mounted and is detachably connected directly or indirectly to the pump case 30 so as to cover at least the upper portion (a side facing in a direction opposite from the pump case 30) of corresponding one of the motor transmission mechanisms 60 in a state where the corresponding electric motor 50 is mounted thereto.

As shown in FIG. 4, in the present embodiment, the electric motor covers 70 are detachably connected to a base plate 80 that is detachably connected to the pump case 30.

More specifically, as shown in FIGS. 2 and 4, the hydraulic actuator unit 1A according to the present embodiment includes the base plate 80 that is detachably connected to one of the side surfaces of the pump case 30 from which the second ends 41b of the paired control shafts 41 are extended outward.

As shown in FIG. 4, the base plate 80 is provided with openings 81 that allow the second ends 41b of the pair of control shafts 41 to be inserted therethrough. The base plate 80 is detachably connected to the relevant side surface of the pump case 30 by means of a fastening member 85 such as a bolt with the second ends 41b of the pair of control shafts 41 being inserted through the openings 81, respectively.

As shown in FIGS. 2 and 4, the operation shaft 62 is placed on the upper surface (the surface on a side opposite from the pump case 30) of the base plate 80 with the second end 41b of the corresponding control shaft 41 being inserted into the hollow portion 62a.

The electric motor case 53 of each of the electric motors 50 is detachably connected to corresponding one of the electric motor covers 70 by means of a fastening member 55 such as a bolt. The electric motor 50 and the electric motor cover 70 thus integrally form an electric motor assembly that is attached directly or indirectly to the pump case 30.

Each of the electric motor covers 70 is detachably connected to the base plate 80 by means of fastening members 79 such as bolts, so that the electric motor assembly is connected to the pump case 30.

More specifically, as shown in FIG. 4, the electric motor covers 70 each have a motor transmission mechanism cover portion 71 that covers the upper portion (the end surface of the operation shaft 62 not facing the pump case 30) of the operation shaft 62 of corresponding one of the motor transmission mechanisms 60, an electric motor mount portion 72 to which corresponding one of the electric motors 50 is connected, and a connection portion 73 that is fixed to a mount portion (the base plate 80 in the present embodiment).

In the present embodiment, each of the electric motor covers 70 has a side wall portion 74 that has a proximal end being placed onto the mount portion and a distal end supporting the motor transmission mechanism cover portion 71.

The side wall portion 74 surrounds the side portion of the operation shaft 62 in such a manner as to allow the electric motor output gear 52d and the sector gear 61 to be engaged with each other in the state where the electric motor cover 70 mounted with the electric motor 50 is directly or indirectly attached to the pump case 30.

In other words, the side wall portion 74 partially surrounds the operation shaft 62 so as to open at least a side of the periphery of the operation shaft 62 on which the sector gear 61 is positioned.

In the present embodiment, the side wall portion 74 has a pair of side walls 74a that are located so as to sandwich the operation shaft 62 therebetween.

The electric motor mount portion 72 is extended from the motor transmission mechanism cover portion 71 toward a side on which the sector gear 61 is located with the operation shaft 62 as a reference, and is configured so that a lower surface facing the pump case 30 serves as an electric motor mount surface.

More specifically, in the present embodiment, each of the electric motors 50 is mounted on the lower surface of the corresponding electric motor mount portion 72 to thereby configure the electric motor assembly, which is attached directly or indirectly to the pump case 30 so that the electric motor output gear 52d is engaged with the corresponding sector gear 61.

As shown in FIGS. 1, 2, and 4, the hydraulic actuator unit 1A according to the present embodiment includes a pair of speed change actuating-side sensors 210 that detect actuation states of the pair of variable displacement mechanisms 40, respectively.

In the present embodiment, each of the speed change actuating-side sensors 210 is configured to detect the rotation position around the respective axis line of corresponding one of the operation shafts 62.

In the present specification, where appropriate, the speed change actuating-side sensors 210 which detect the actuation states of the first variable displacement mechanism 40(1) and the second variable displacement mechanism 40(2) will be referred to as a first speed change actuating-side sensor 210 (1) and a second speed change actuating-side sensor 210(2), respectively.

More specifically, as shown in FIG. 4, the operation shaft 62 has a detected portion 62b at an end on a side opposite from an end connected with the control shaft 41.

Each of the electric motor covers 70 has an opening 71a in the motor transmission mechanism cover portion 71 at a portion to face the detected portion 62b. Each of the speed change actuating-side sensors 210 is attached to corresponding one of the electric motor covers 70 so as to detect an angle of rotation of the detected portion 62b via the opening 71a.

As shown in FIG. 1, each of the electric motors 50 is preferably provided with a clutch structure 100 that has a reverse-rotation preventing function of preventing the worm shaft 52a from being rotated around the axis line by power applied from corresponding one of the variable displacement mechanisms while allowing the worm shaft 52a to be rotated around the axis line in accordance with rotation of the electric motor main body 51.

Provision of the clutch structure 100 effectively prevents the movable swash plate 42 from unintentionally slanting from a set slanting position while allowing the movable swash plate 42 to be slanted by the electric motor main body 51.

Figure 5:
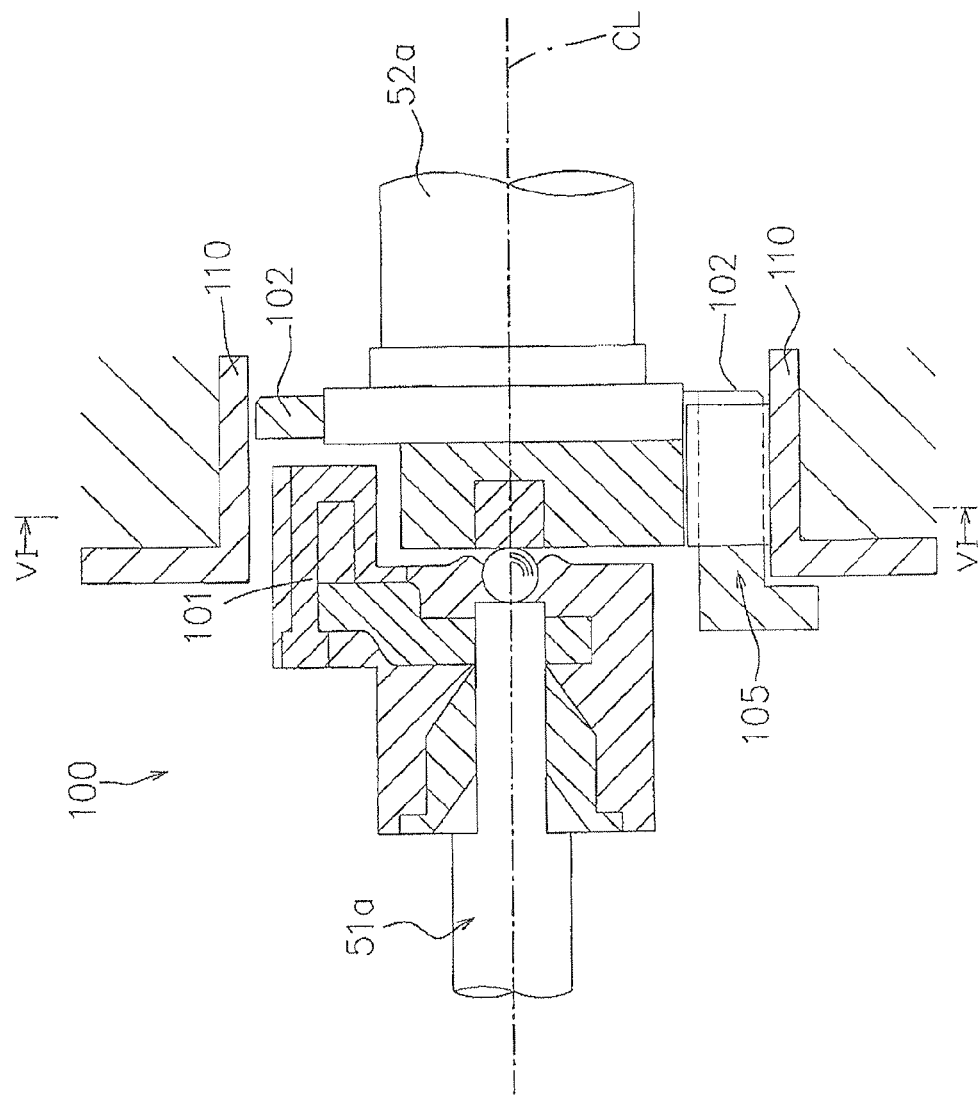
FIG. 5 is a cross sectional view taken along line V-V in FIG. 1.

FIG. 5 is a cross sectional view of the clutch structure 100 taken along line V-V indicated in FIG. 1.

Figure 6A:
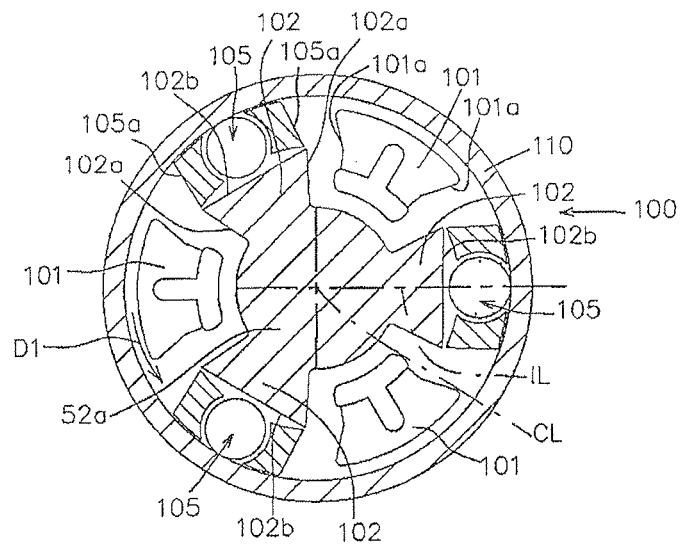
FIGS. 6A to 6C are cross sectional views taken along line VI-VI in FIG. 5.
Figure 6B:
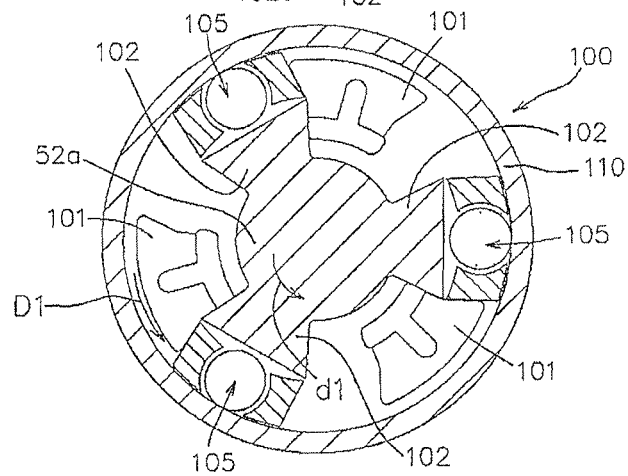
Figure 6C:
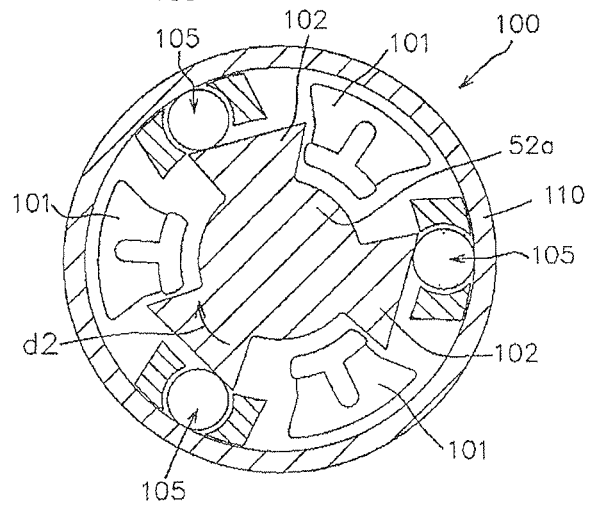

FIGS. 6A to 6C are cross sectional views of the clutch structure 100 taken along line VI-VI indicated in FIG. 5.

As shown in FIGS. 5 and 6A to 6C, the clutch structure 100 includes a driving-side arm 101 that is provided at an distal end of the output shaft 51a of the electric motor main body 51 so as to extend radially outward, a collar member 110 that surrounds the driving-side arm 101, a driven-side arm 102 that is provided at the end of the worm shaft 52a closer to the output shaft 51a so as to extended radially outward, and a contact member 105 that is disposed between the driven-side arm 102 and the collar member 110 with respect to a radial direction with the axis line of the output shaft 51a and the worm shaft 52a being as a reference.

The driving-side arm 101 has side surfaces 101a facing in a circumferential direction with the axis line of the output shaft 51a being as a reference, and the side surfaces 101a are configured so as to press, in the circumferential direction, side surfaces 102a and 105a of the driven-side arm 102 and the contact member 105 that face in the circumferential direction.

As shown in FIGS. 6A to 6C, the driven-side arm 102 has an outer end surface 102b that faces radially outward, the outer end surface 102b being substantially perpendicular to a virtual line IL connecting a circumferential center of the outer end surface 102b and an axis line CL of the output shaft 51a and the worm shaft 52a when seen along the axis line CL.

The clutch structure 100 thus configured is actuated as follows.

When the corresponding electric motor 50 receives from a control unit 500 to be described below, which is provided in a working vehicle adopting the hydraulic actuator unit 1 A, a control signal for axially rotating the electric motor main body 51 in one direction (normal rotation for allowing the working vehicle to travel forward, for example) around the axis line or in the other one direction (reverse rotation for allowing the working vehicle to travel rearward, for example), the electric motor main body 51 is rotated in one of the directions (hereinafter, referred to as a first direction D 1) around the axis line according to the control signal (see FIG. 6A) so that the driving-side arm 101 presses both the driven-side arm 102 and the contact member 105 into the first direction D1. Accordingly, the worm shaft 52a is rotated in a direction d1 identical with the first direction D1 (see FIG. 6B) so that the movable swash plate 42 is slanted into a direction corresponding to the first direction D1.

The hydraulic pressure of the operational fluid that the hydraulic actuator (the hydraulic pump main body 10 in the present embodiment) suctions and discharges may function as power applied to the movable swash plate 42 for slanting the same. Further, in accordance with needs, the hydraulic actuator unit 1A may further include neutral springs 120 that bias the movable swash plates 42 toward the neutral positions, respectively.

Therefore, when the electric motor 50 is in non-actuation state, the movable swash plate 42 is slightly slanted toward the neutral position against the inertial force of the electric motor 50.

In accordance with this slanting, as shown in FIG. 6C, the worm shaft 52a that is operatively connected to the movable swash plate 42 is rotated in a second direction d2 corresponding to the direction toward the neutral position, while the position of the freely provided contact member 105 being unchanged.

As described above, each of the outer end surfaces 102b of the driven-side arm 102 is substantially perpendicular to the virtual line IL connecting the circumferential center of the outer end surface 102b and the axis CL of the worm shaft 52a. Therefore, rotation of the driven-side arm 102 into the second direction d2 causes the contact member 105 to be pressed to the inner circumferential surface of the collar member 110, so that the worm shaft 52a is in a locked state incapable of being rotated (see FIG. 6C).

As a result, it is possible to effectively prevent the movable swash plate 42 from unintentionally slanting from a predetermined slanting position after the electric motor 50 locates the movable swash plate 42 at the predetermined slanting position.

The hydraulic actuator unit 1A according to the present embodiment further has a configuration as described below so as to be easily switched between an electric mode of actuating the variable displacement mechanisms 40 with use of the electric motors 50 and a manual mode of manually actuating the variable displacement mechanisms 40.

More specifically, as shown in FIGS. 1, 3, and 4, the hydraulic actuator unit 1A includes the neutral springs 120 that bias the variable displacement mechanisms 40 toward the neutral positions, respectively.

As described earlier, the hydraulic actuator unit 1A according to the present embodiment includes the pair of variable displacement mechanisms 40. Accordingly, the hydraulic actuator unit 1A includes a pair of the neutral springs 120 that bias the pair of variable displacement mechanisms 40 toward the neutral positions, respectively.

Although being useful in the manual mode of manually operating the variable displacement mechanisms 40, these neutral springs 120 are not required in the electric mode of operating the variable displacement mechanisms 40 with use of the electric motors 50.

More specifically, in the electric mode, the position control of each of the variable displacement mechanisms 40 is performed based on an electric control signal that is received by corresponding one of the electric motors 50. In such electric mode, the influence of the neutral spring 120 increases the load applied to the electric motor 50 and thus increases the power consumed by the electric motor 50.

Moreover, the neutral spring 120 generates the biasing power that is gradually increased as the variable displacement mechanism 40 is shifted from the neutral position toward the actuation position (in the present embodiment, as the movable swash plate 42 is gradually slanted from the neutral position toward the maximum slanting position). Accordingly, if the neutral spring 120 influences the variable displacement mechanism 40 in the electric mode, the response of the variable displacement mechanism 40 to be actuated and controlled by the electric motor 50 will be varied in accordance with the actuation state of the variable displacement mechanism 40.

In view of the above, the hydraulic actuator unit 1A according to the present embodiment is configured so as to inhibit the neutral springs 120 from influencing the variable displacement mechanisms 40 in the electric mode while allowing the neutral springs 120 to influence the variable displacement mechanisms 40 in the manual mode More specifically, as shown in FIGS. 3 and 4, the hydraulic actuator unit 1A includes engagement arms 65 that are supported respectively by the operation shafts 62 in a relatively non-rotatable manner with respect thereto.

In the present embodiment, the engagement arms 65 are each formed integrally with corresponding one of the sector gears 61.

As already described, the operation shafts 62 are operatively connected to the variable displacement mechanisms 40, respectively. Thus, the engagement arms 65 swing about the axis line of the operation shafts 62 in accordance with the actuation states of the variable displacement mechanisms 40, respectively.

Specifically, when the variable displacement mechanism 40 is in the neutral state, the engagement arm 65 is located at the neutral position around the axis line of the operation shaft 62.

In a case where the variable displacement mechanism 40 is shifted from the neutral state into the normal-rotation output state, the corresponding engagement arm 65 is turned from the neutral position into a first direction about the axis line of the operation shaft 62. When the variable displacement mechanism 40 is brought into the maximum normal-rotation output state (in the present embodiment, when the movable swash plate 42 is located at the normal rotation maximum slanting position), the engagement arm 65 is turned around the axis line from the neutral position fully into the first direction to reach a normal-rotation maximum position.

In a case where the variable displacement mechanism 40 is shifted from the neutral state into the reverse-rotation output state, the corresponding engagement arm 65 is turned from the neutral position into a second direction about the axis line of the operation shaft 62. When the variable displacement mechanism 40 is brought into the maximum reverse-rotation output state (in the present embodiment, when the movable swash plate 42 is located at the reverse rotation maximum slanting position), the engagement arm 65 is turned around the axis line from the neutral position fully into the second direction to reach a reverse-rotation maximum position.

In summary, the engagement arm 65 is rotated about the axis line of the corresponding operation shaft 62 within a rotational range between the normal-rotation maximum position and the reverse-rotation maximum position in accordance with the actuation state of the corresponding variable displacement mechanism 40.

As shown in FIG. 4, the neutral spring 120 has a pair of spring pieces 121 that can sandwich the engagement arm 65 of corresponding one of the operation shafts 62.

The neutral spring 120 is attached directly or indirectly to the pump case 30 at a position where the pair of spring pieces 121 holds the corresponding engagement arm 65 at the neutral position.

In the present embodiment, as shown in FIG. 4, the neutral spring 120 is detachably fixed to the base plate 80.

Further, as shown in FIG. 4, the electric motor cover 70 is provided with a prevention arm 75 that is inserted between the pair of spring pieces 121 of the corresponding neutral spring 120 so as to push the pair of spring pieces 121 apart from each other when the electric motor cover 70 is attached directly or indirectly to the pump case 30.

The prevention arm 75 is extended from the motor transmission mechanism cover portion 71 toward a side on which the engagement arm 65 is located.

The side wall portion 74 is configured so as to open a side of the periphery of the operation shaft 62 on which the engagement arm 65 is located.

Figure 7A:
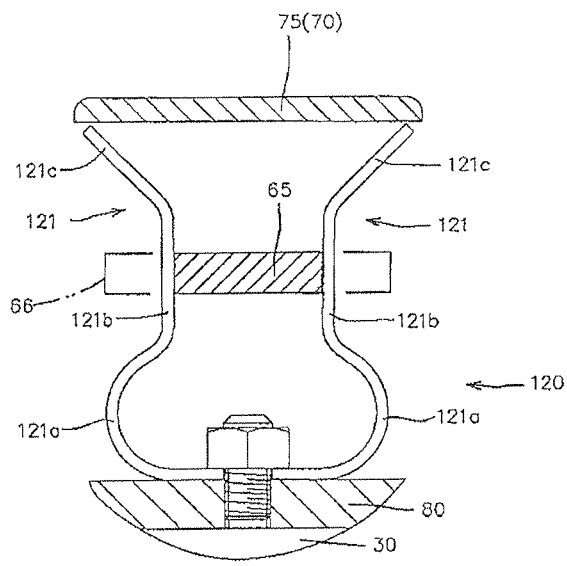
FIGS. 7A and 7B are cross sectional views taken along line VII-VII in FIG. 1.
Figure 7B:
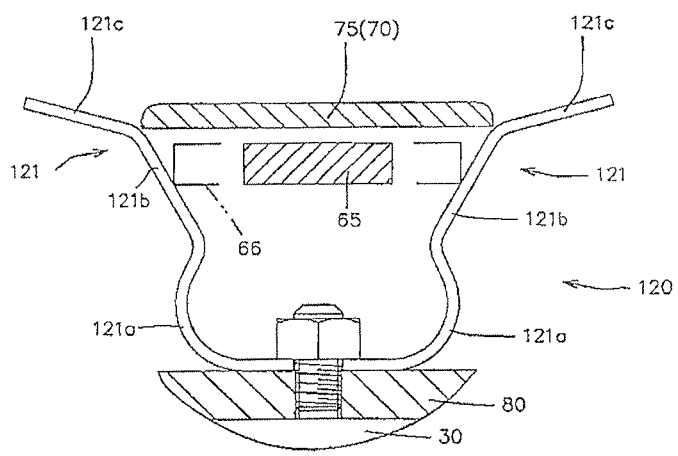

FIGS. 7A and 7B are cross sectional views taken along line VII-VII indicated in FIG. 1.

FIG. 7A shows a state where the electric motor cover 70 is being attached the pump case 30 (the base plate 80 in the present embodiment). FIG. 7B shows a state where the electric motor cover 70 has been attached to the pump case 30.

FIGS. 7A and 7B also show a rotational range 66 in which the engagement arm 65 could be rotated.

As shown in FIG. 7B, in the state where the electric motor cover 70 has been attached to the pump case 30, the prevention arm 75 pushes the pair of spring pieces 121 of the corresponding neutral spring 120 apart from each other so that the engagement arm 65 is allowed to be freely rotated within the rotational range 66 with no influence of the pair of spring pieces 121.

FIG. 8 is a cross sectional view taken along line III-III shown in FIG. 2 with the electric motor covers 70 being detached.

To the contrary, when the electric motor covers 70 are detached from the pump case 30, as shown in FIG. 8, the neutral spring 120 holds corresponding one of the engagement arms 65 at the neutral position.

The hydraulic actuator unit 1A configured as described above makes it possible to prevent each of the neutral springs 120 from influencing corresponding one of the engagement arms 65 in the electric mode where the electric motor assembly configured by the electric motor 50 and the electric motor cover 70 being connected with each other are attached to the pump case 30. Further, the hydraulic actuator unit 1A makes it possible to hold each of the engagement arms 65 at the neutral position by corresponding one of the neutral springs 120 in the manual mode where the electric motor assembly is detached from the pump case 30.

As shown in FIGS. 4, 7A, and 7B, free end portions of the pair of spring pieces 121 of the neutral spring 120 are preferably formed to be gradually distant from each other as a distance to the free ends is reduced.

The configuration makes it possible to cause the pair of spring pieces 121 to be smoothly pushed apart from each other by the prevention arm 75 upon attaching the electric motor cover 70 to the pump case 30.

In the present embodiment, as shown in FIGS. 7A and 7B, the pair of spring pieces 121 each have a proximal end 121a that is fixed directly or indirectly to the pump case 30, an intermediate portion 121b that extends from the proximal end 121a in a direction away from the pump case 30, and the free end 121c that extends from the intermediate portion 121b in the direction away from the pump case 30. The pair of spring pieces 121 are configured so as to sandwich corresponding one of the engagement arms 65 at intermediate portions 121b.

As shown in FIG. 8, a free end of the engagement arm 65 is preferably has a curved shape where it is most distant from the axis line of the operation shaft 62 at a circumferential center with the axis line of the operation shaft 62 as a reference and is gradually closer to the axis line as it is away from the circumferential center into one side and the other side in the circumferential direction around the axis line.

The preferable configuration allows the engagement arm 65 to be smoothly rotated within the rotational range 66 while being sandwiched between the pair of spring pieces 121 in the manual mode.

Preferably, the hydraulic actuator unit 1A may further include a structure for assisting rotation of the operation shaft 62 in accordance with manual operation.

As shown in FIGS. 4 and 8, in the present embodiment, the sector gear 61, which is supported by the corresponding operation shaft 62 in a relatively non-rotatable manner with respect thereto, is provided with engagement holes 61*a*. In the manual mode, the operation shaft 62 can be manually rotated around the axis line easily with use of, for example, an operation rod 130 shown in FIG. 9.

The operation rod 130 has a grip portion 131 at the proximal end, an engagement portion 133 at the distal end, and a rod portion 132 that connects the grip portion 131 and the engagement portion 133. The engagement portion 133 is provided with engagement projections 135 that can be engaged in the engagement holes 61*a*, respectively.

Figure 9:
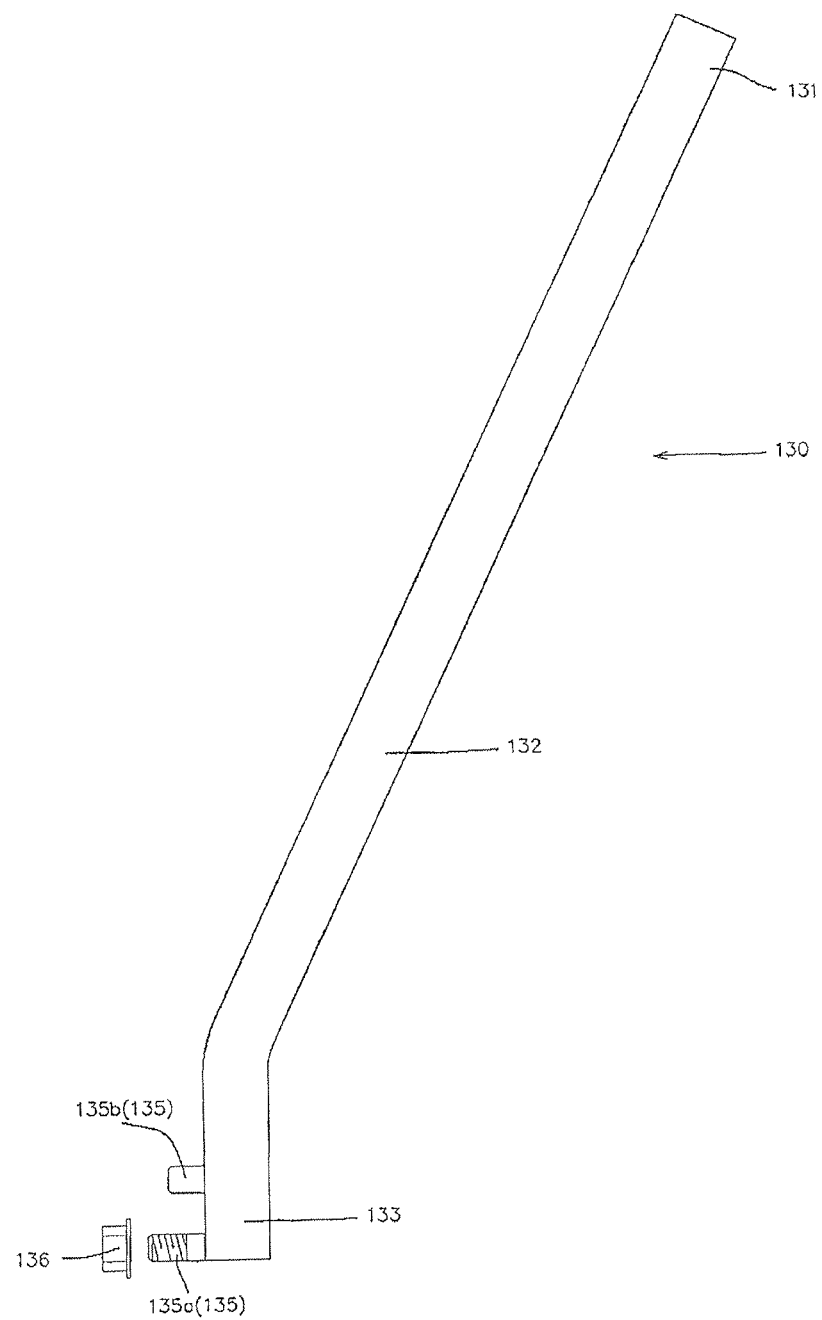
FIG. 9 is a schematic view of an operation rod that may be used in a manual mode.

In the operation rod 130 shown in FIG. 9, the engagement projections 135 include a first engagement projection 135*a* provided with an outer screw and a second engagement projection 135*b* provided with no outer screw.

FIG. 9 also shows a nut 136 that is screwed to the first engagement projection 135*a* after the first engagement projection 135*a* has been inserted into corresponding one of the engagement holes 61*a*.

The hydraulic actuator unit 1A according to the present embodiment is formed as a dual hydraulic pump unit having the first and second hydraulic pump main bodies 10(1) and 10(2) disposed in parallel with each other, wherein the control shafts 41 which change the suction/discharge amounts and the suction/discharge directions of the hydraulic fluid of the first and second hydraulic pump main bodies 10(1) and 10(2), respectively, are extended outward from the identical side surface of the pump case 30.

In the hydraulic actuator unit 1A thus configured, as shown in FIGS. 1 to 3, the first electric motor 50(1) operatively acting on the control shaft 41 (hereinafter, referred to as a first control shaft 41(1) where appropriate) of the first variable displacement mechanism 40(1) is disposed on a side of the first control shaft 41(1) that is opposite from the control shaft 41 (hereinafter, referred to as a second control shaft 41(2) where appropriate) of the second variable displacement mechanism 40(2) so that the first control shaft 41(1) is interposed between the first electric motor 50(1) and the second control shaft 41(2). The second electric motor 50(2) operatively acting on the second control shaft 41(2) is disposed on a side of the second control shaft 41(2) that is opposite from the first control shaft 41(1) so that the second control shaft 41(2) is interposed between the second electric motor 50(2) and the first control shaft 41(1).

This preferable configuration realizes reduction in size of the entire hydraulic actuator unit 1A that is inclusive of the first and second electric motors 50(1) and 50(2).

As shown in FIGS. 1 to 4, in the electric motors 50 adopted in the present embodiment, the output shaft 51*a* of the electric motor main body 51 and the worm shaft 52*a* are disposed coaxially with each other, and the worm wheel 52*b* is engaged with the worm shaft 52*a* in a state where the rotational axis line of the worm wheel 52*b* is perpendicular to the axis line of the worm shaft 52*a* at a position displaced from the axis line of the worm shaft 52*a*.

In other words, the electric motor 50 has an asymmetrical shape with respect to a motor virtual plane MP (see FIG. 1) that passes through the axis line of the worm wheel 52*b* and is parallel to the axis line of the worm shaft 52*a*.

The hydraulic actuator unit 1A according to the present embodiment further includes a following configuration in order to reduce the size of the hydraulic actuator unit 1A as a whole, in a state where the electric motors 50 having such an asymmetrical structure is used and the member operatively connecting the first electric motor 50(1) and the first variable displacement mechanism 40(1) is configured identically with the member operatively connecting the second electric motor 50(2) and the second variable displacement mechanism 40(2).

As shown in FIGS. 1 and 3, the variable displacement mechanism 40 and the electric motor cover 70 have a symmetrical shape with respect to a first virtual plane P1 passing through the axis lines of the first control shaft 41(1) and the second control shaft 41(2) in a state where the variable displacement mechanism 40 and the electric motor cover 70 are attached directly or indirectly to the pump case 30.

The first electric motor 50(1) is attached to corresponding one (hereinafter, referred to as a first electric motor cover 70(1) where appropriate) of the electric motor covers 70 such that the electric motor main body 51 thereof is located on one side of the first virtual plane P1 and on a side of the first control shaft 41(1) that is opposite from the second control shaft 41(2) to sandwich the first control shaft 41(1) between the electric motor main body 51 and the second control shaft 41(2).

On the other hand, the second electric motor 50(2) is attached to corresponding one (hereinafter, referred to as a second electric motor cover 70(2) where appropriate) of the electric motor covers 70 such that the electric motor main body 51 thereof is located on the other side of the first virtual plane P1 and on a side of the second control shaft 41(2) that is opposite from the first control shaft 41(1) to sandwich the second control shaft 41(2) between the electric motor main body 51 and the first control shaft 41(1).

In other words, a second hydraulic pump main body displacement operation assembly inclusive of the second electric motor 50(2), corresponding one of the motor transmission mechanisms 60 and the second electric motor cover 70(2) is attached directly or indirectly to the pump case 30 at a posture obtained by rotating a first hydraulic pump main body displacement operation assembly inclusive of corresponding one of the motor transmission mechanisms 60 and the first electric motor cover 70(1) by 180 degrees about a virtual center line IC (see FIG. 1) that is disposed parallel to the first and second control shafts 41(1) and 41(2) and is located at a center between the first and second control shafts 41(1) and 41(2).

Alternatively, the first and second electric motors 50(1) and 50(2) may be disposed on the same side of the first virtual plane P1 in a state where the first electric motor 50(1) is disposed on a side of the first control shaft 41(1) that is opposite from the second control shaft 41(2) and the second electric motor 50(2) is disposed on a side of the second control shaft 41(2) that is opposite from the first control shaft 41(1).

Figure 10:
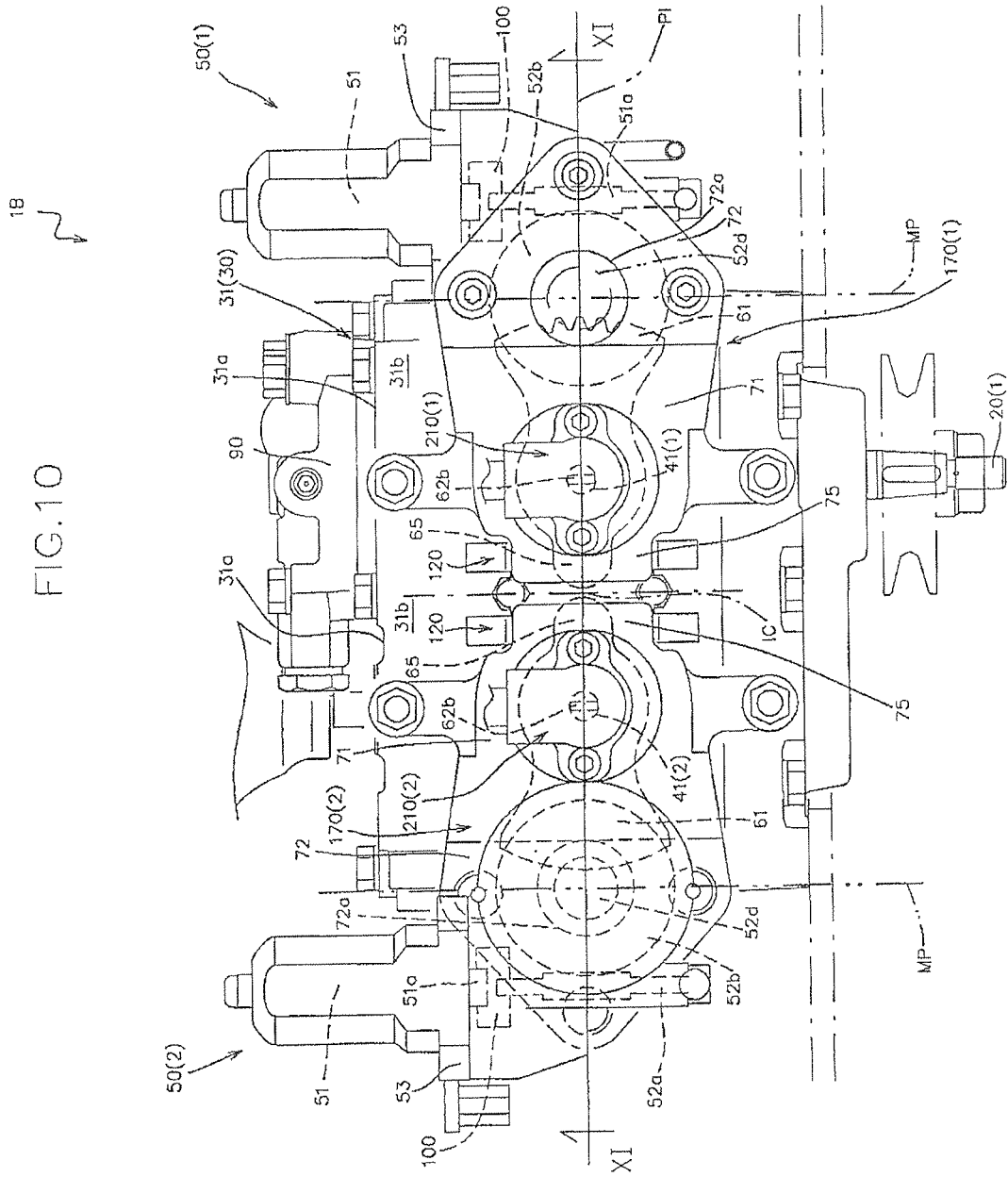
FIG. 10 is an end view of a hydraulic actuator unit according to a modified example of the first embodiment.

FIG. 10 is an end view, as viewed along the axes of the first control shaft 41(1) and the second control shaft 41(2), of a hydraulic actuator unit 1B according to a modified example of the present embodiment.

Figure 11:
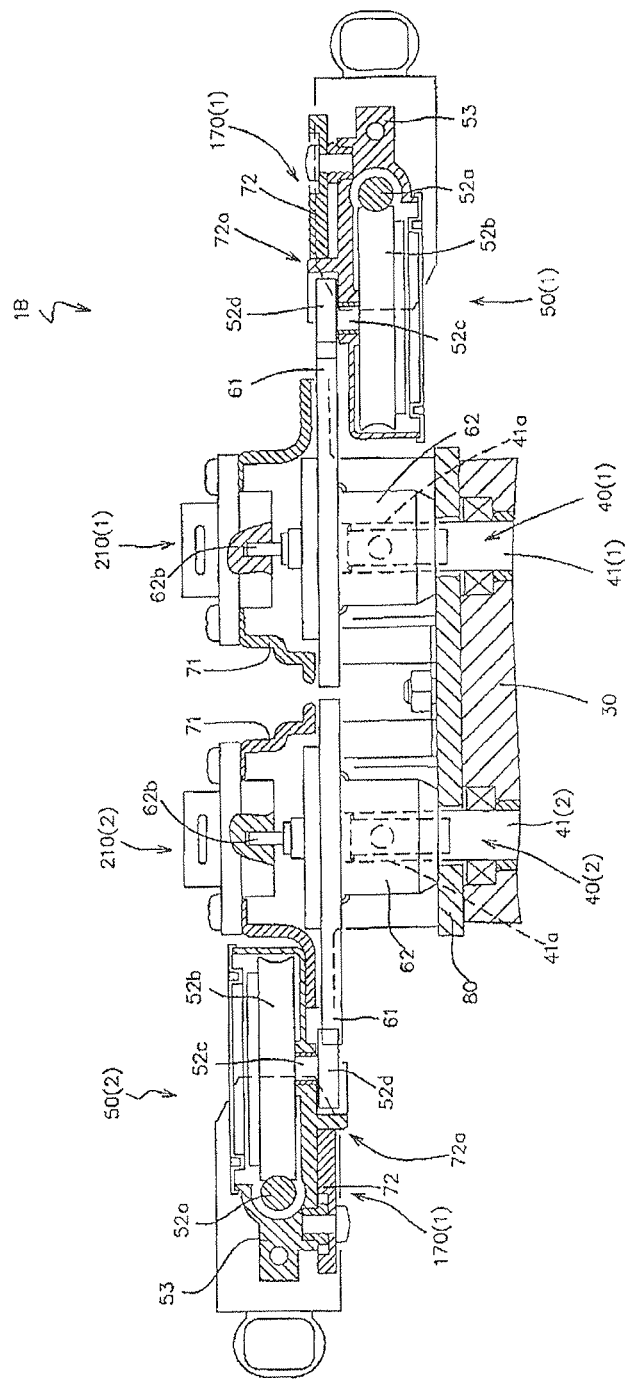
FIG. 11 is a cross sectional view taken along line XI-XI in FIG. 10.

FIG. 11 is a cross sectional view taken along line XI-XI indicated in FIG. 10.

In the drawings, the members identical with those of the hydraulic actuator unit 1A according to the first embodiment are denoted by the identical reference numerals and detailed description thereof will not be repeatedly provided.

As shown in FIGS. 10 and 11, in the hydraulic actuator unit 1B according to the modified example, the second hydraulic pump main body displacement operation assembly except for the second electric motor 50(2) is attached directly or indirectly to the pump case 30 at a posture obtained by rotating the first hydraulic pump main body displacement operation assembly except for the first electric motor 50(1) by 180 degrees about the virtual center line IC. The first and second electric motors 50(1) and 50(2) are attached to the respective electric motor covers 70 so as to be located on the same side of the first virtual plane P1.

More specifically, the hydraulic actuator unit 1B according to the modified example has a pair of electric motor covers 170 in place of the pair of electric motor covers 70 in comparison with the hydraulic actuator unit 1A according to the first embodiment.

One of the electric motor covers 170 to which the first electric motor 50(1) is attached will be referred to as a first electric motor cover 170(1) and the other one of the electric motor covers 170 to which the second electric motor 50(2) is attached will be referred to as a second electric motor cover 170(2), where appropriate.

Each of the electric motor covers 170 in the modified example is configured such that both the lower surface of the electric motor mount portion 72 that faces the pump case 30 and the upper surface that faces in an direction opposite from the pump case 30 can serve as the electric motor mount surfaces.

Figure 12A:
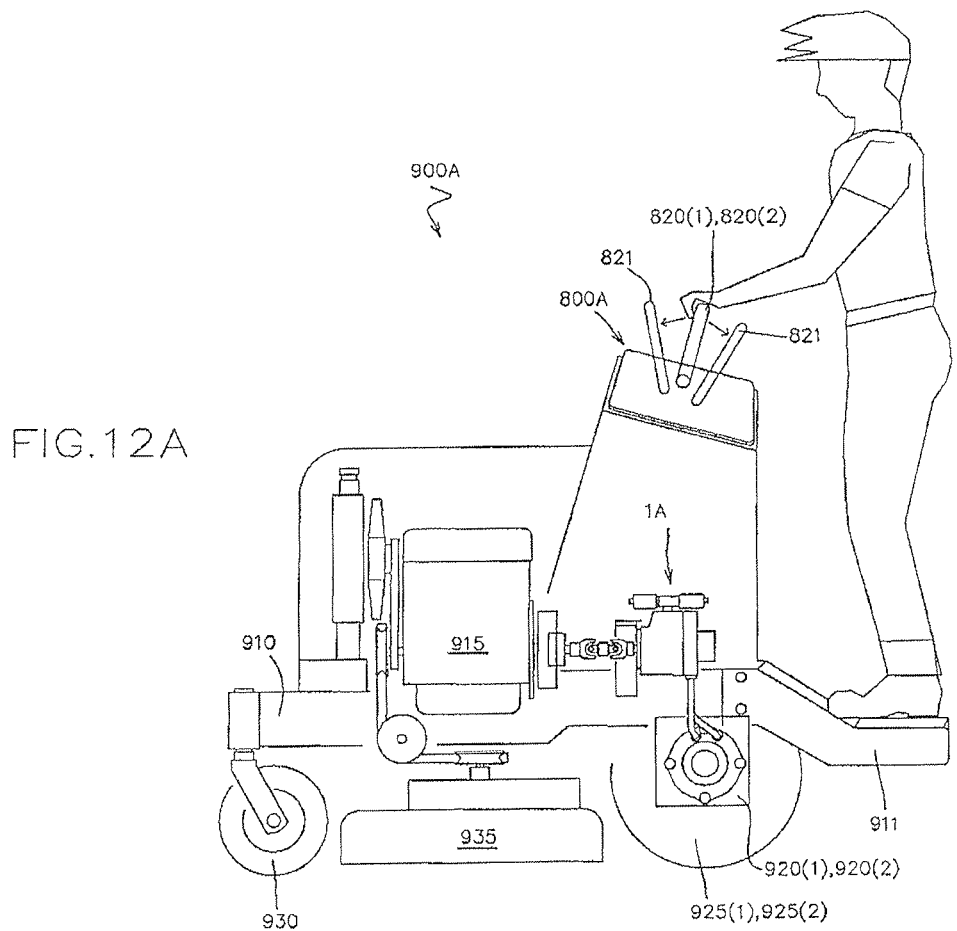
FIG. 12A is a side view of a first example of a working vehicle to which the hydraulic actuator unit according to the present invention could be applied.
Figure 12B:
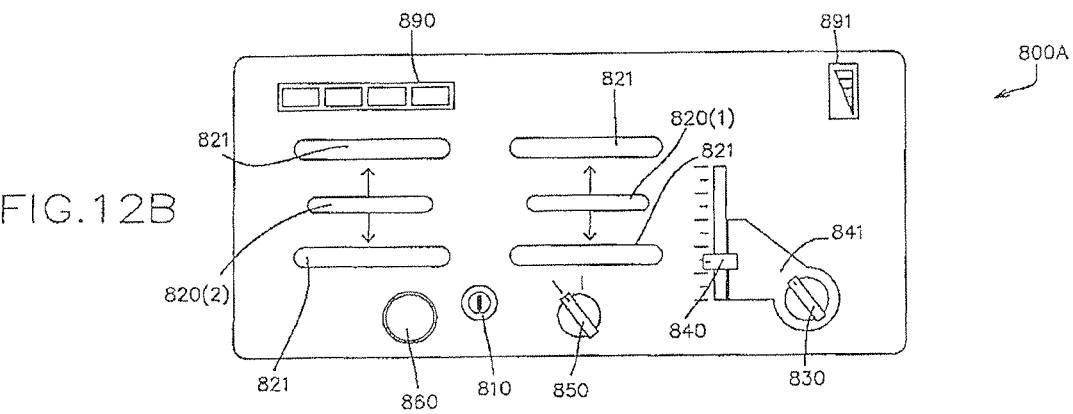
FIG. 12B is a schematic view of an operation unit included in the working vehicle according to the first example.

More specifically, as shown in FIGS. 11, 12A, and 12B, the electric motor mount portion 72 is formed with an opening 72a passing through from the upper to lower surfaces and has a size that allows the electric motor output gear 52d to be inserted therethrough.

In the case where the electric motor 50 is mounted on the upper surface of the electric motor mount portion 72, the electric motor output gear 52d is located on a side closer to the lower surface of the electric motor mount portion 72 through the opening 72a.

In the modified hydraulic actuator unit 1B including the electric motor covers 170, the first electric motor 50(1) is mounted on one of the upper and lower surfaces (the lower surface in the drawings) of the electric motor mount portion 72 of corresponding one of the electric motor covers 170, while the second electric motor 50(2) is mounted on the other one of the upper and lower surfaces (the upper surface in the drawings) of the electric motor mount portion 72 of corresponding one of the electric motor covers 170, so that the first and second electric motors 50(1) and 50(2) are placed on the same side of the first virtual plane P1.

In the case where the electric motor 50 is mounted on the lower surface of the electric motor mount portion 72, the opening 72a is preferably sealed by a lid member (not shown) which is attached to the upper surface of the electric motor mount portion 72.

As shown in FIGS. 3, 10, and the like, in the hydraulic actuator unit 1A according to the present embodiment and the hydraulic actuator unit 1B according to the modified example, each of the engagement arms 65 is located on a side of corresponding one of the operation shafts 62 that is opposite from the sector gear 61 so that the operation shafts 62 is interposed between the sector gear 61 and the engagement arms 65.

In this configuration, the pair of neutral springs 120 can be disposed close to each other, so that it is possible to achieve reduction in size of the entire hydraulic actuator unit 1A or 1B including the pair of neutral springs 120.

As shown in FIGS. 4 and the like, in the present embodiment and the modified example, the pair of neutral springs 120 are configured integrally with each other by a single member.

Each of the hydraulic actuator unit 1A according to the present embodiment and the hydraulic actuator unit 1B according to the modified example is preferably applied to a riding mower.

FIG. 12A is a side view of a working vehicle 900A according to a first example.

FIG. 12B is a schematic view of an operation unit 800A included in the working vehicle 900A.

Figure 13:
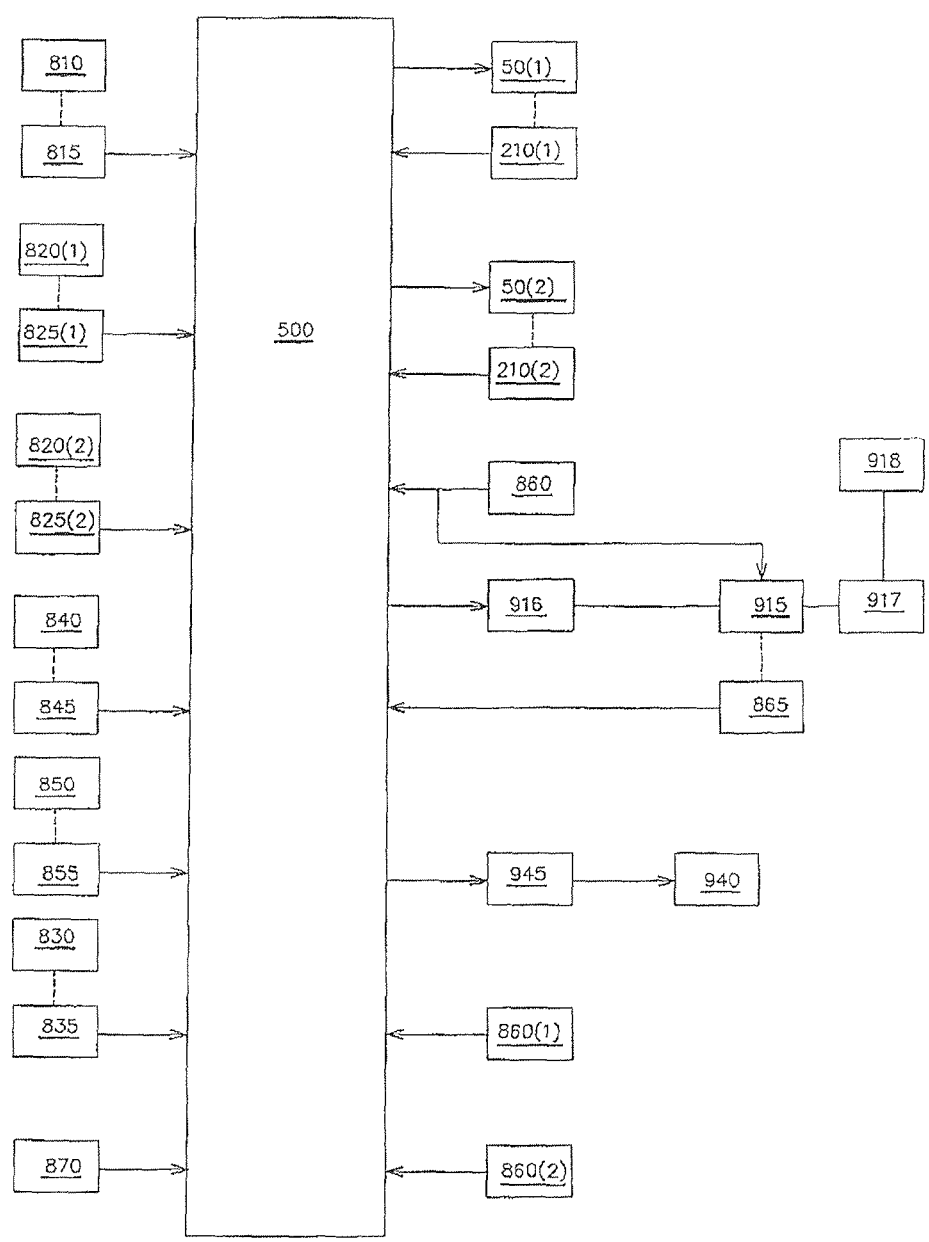
FIG. 13 is a system block diagram of a control unit included in the working vehicle according to the first example.

Further, FIG. 13 is a system block diagram of a control unit 500 included in the working vehicle 900A.

As shown in FIG. 12A, the working vehicle 900A according to the first example is formed as a standing type riding mower.

More specifically, as shown in FIGS. 12A, 12B, and 13, the working vehicle 900A according to the first example includes a vehicle frame 910 provided with a driver's platform 911, the hydraulic actuator unit 1A, an engine 915, a first wheel motor unit 920(1), a second wheel motor unit 920(2), a pair of left and right driving wheels 925(1) and 925(2), a caster wheel 930, a mower unit 935, the operation unit 800A, a starter 916, a power generator unit 917, a battery 918, and the control unit 500. The engine 915 is supported by the vehicle frame 910 and functions as a power source of the first and second hydraulic pump main bodies 10(1) and 10(2) of the hydraulic actuator unit 1A. The first wheel motor unit 920(1) has a hydraulic motor main body fluidly connected to the first hydraulic pump main body 10(1) via the pair of first HST lines and is supported by the vehicle frame 910 so as to be positioned on a first side in the vehicle width direction. The second wheel motor unit 920(2) has a hydraulic motor main body fluidly connected to the second hydraulic pump main body 10(2) via the pair of second HST lines and is supported by the vehicle frame 910 so as to be positioned on a second side in the vehicle width direction. The pair of left and right driving wheels 925(1) and 925(2) are operatively driven by the first and second wheel motor units 920(1) and 920(2), respectively. The caster wheel 930 is supported by the vehicle frame 910. The mower unit 935 is supported by the vehicle frame 910 and is operatively driven by the driving power source 915. The operation unit 800A is fixed to the vehicle frame 910 in a state capable of being manually operated by a driver standing on the driver's platform 911. The starter 916 starts the driving power source 915. The power generator unit 917 generates electric power with use of rotational power of the driving power source 915. The battery 918 stores electric power generated by the power generator unit 917. The control unit 500 controls actuation of the first and second electric motors 50(1) and 50(2).

As shown in FIG. 12A, in the working vehicle 900A according to the first example, the engine 915 is of the horizontal type with the output shaft extending in the horizontal direction. Needless to say, the working vehicle 900A may alternatively adopt an engine of the vertical type with the output shaft extending in the vertical direction.

As shown in FIG. 12B, the operation unit 800A has a key operation input portion 810 that is used to switch on/off the main power supply of the working vehicle 900A as well as to switch on/off the starter 916, and a pair of speed change operating members 820 that are used to operate the pair of variable displacement mechanisms 40, respectively.

Hereinafter, where appropriate, one of the speed change operating members 820 used for operating the first variable displacement mechanism 40(1) will be referred to as a first speed change operating member 820(1) while the other one of the speed change operating members 820 used for operating the second variable displacement mechanism 40(2) will be referred to as a second speed change operating member 820(2).

The key operation input portion 810 is configured such that a key inserted into the key operation input portion 810 can be located at a main power supply off position, a main power supply on position and a starter on position, in accordance with driver manipulation.

As shown in FIG. 13, the position of the operated key is detected by a key operation position sensor 815 that is included in the working vehicle.

In the working vehicle 900A according to the first example, the first and second speed change operating members 820(1) and 820(2) are each formed as a swing arm that is swingable about a rotational axis along the vehicle width direction.

FIGS. 12A and 12B also show stoppers 821 that define the operable ranges of the first and second speed change operating members 820(1) and 820(2).

As shown in FIG. 13, positions (directions and amounts of operation) of the operated first and second speed change operating members 820(1) and 820(2) are detected by first and second speed change operating-side sensors 825(1) and 825(2) that are included in the working vehicle 900A.

The control unit 500 performs control of the first and second electric motors 50(1) and 50(2) according to manual operation on the first and second speed change operating members 820(1) and 820(2) on the basis of signals from the first and second speed change operating-side sensors 825(1) and 825(2) as well as from the first and second speed change actuating-side sensors 210(1) and 210(2) which are included in the hydraulic actuator unit 1A.

The operation unit 800A of the working vehicle 900A according to the first example is further provided with a mower on/off member 830, a maximum-speed setting member 840, a mode switching member 850, and a emergency stop member 860.

FIG. 12B also shows an indicator 890 for displaying errors as well as an indicator 891 for displaying the amount of electric power stored in the battery.

The mower on/off member 830 is operated to drive or stop the mower unit 935.

More specifically, as shown in FIG. 13, the working vehicle 900A includes a mower on/off sensor 835 that detects the operation state of the mower on/off member 830, a mower clutch 940 that is inserted in a working unit power transmission path from the engine 915 to the mower unit 935, and a mower electric motor 945 that actuates the mower clutch 940.

The control unit 500 actuates the mower electric motor 945 in accordance with manual operation of the mower on/off member 830 so as to engage or disengage the mower clutch 940.

The maximum-speed setting member 840 is operated to set the maximum speed of the working vehicle 900A.

In other words, the maximum-speed setting member 840 is used for setting an actuating amount of corresponding one of the variable displacement mechanisms 40 in a case where the first speed change operating member 820(1) or the second speed change operating member 820(2) is operated to the maximum level, so that the maximum speed of the working vehicle 900A is set.

More specifically, as shown in FIG. 13, the working vehicle 900A includes a top speed sensor 845 that detects the position of the operated maximum-speed setting member 840.

The control unit 500 stores control data on the actuating amounts of the first and second electric motors 50(1) and 50(2) relative to the operating amounts of the first and second speed change operating members 820(1) and 820(2) for respective maximum speeds that can be set by the maximum-speed setting member 840.

The control unit 500 selects the control data corresponding to the position of the operated maximum-speed setting member 840, and performs actuation control of the first and second electric motors 50(1) and 50(2) in accordance with manual operation on the first and second speed change operating members 820(1) and 820(2) with use of the selected control data.

The control unit 500 preferably actuates the mower electric motor 945 such that the mower unit 935 is stopped regardless of the operation state of the mower on/off member 830 in a case where a maximum speed exceeding a predetermined value is set by the maximum-speed setting member 840.

FIG. 12B also shows a maximum-speed range 841 in which the mower unit 935 can be driven.

The emergency stop member 860 is operated to forcibly stop the engine 915 in emergencies.

When the emergency stop member 860 is operated, the engine 915 is forcibly stopped and the main power supply of the working vehicle 900A is forcibly switched off by way of the control unit 500.

The mode switching member 850 is operated to change the actuating speeds of the first and second electric motors 50(1) and 50(2).

More specifically, as shown in FIG. 13, the working vehicle 900A includes a mode switch sensor 855 that detects the position of the operated mode switching member 850. The control unit 500 switches the actuating speed of each of the electric motors 50 between a standard speed and a high speed, for example, on the basis of a signal transmitted from the mode switch sensor 855 according to manual operation on the mode switching member 850.

FIG. 13 also shows first and second axle sensors 860(1) and 860(2) that detect the rotational speeds of the pair of driving wheels 925(1) and 925(2), respectively.

Further shown in FIG. 13 is an engine output sensor 865 that detects the rotational frequency of the engine 915.

Figure 14:
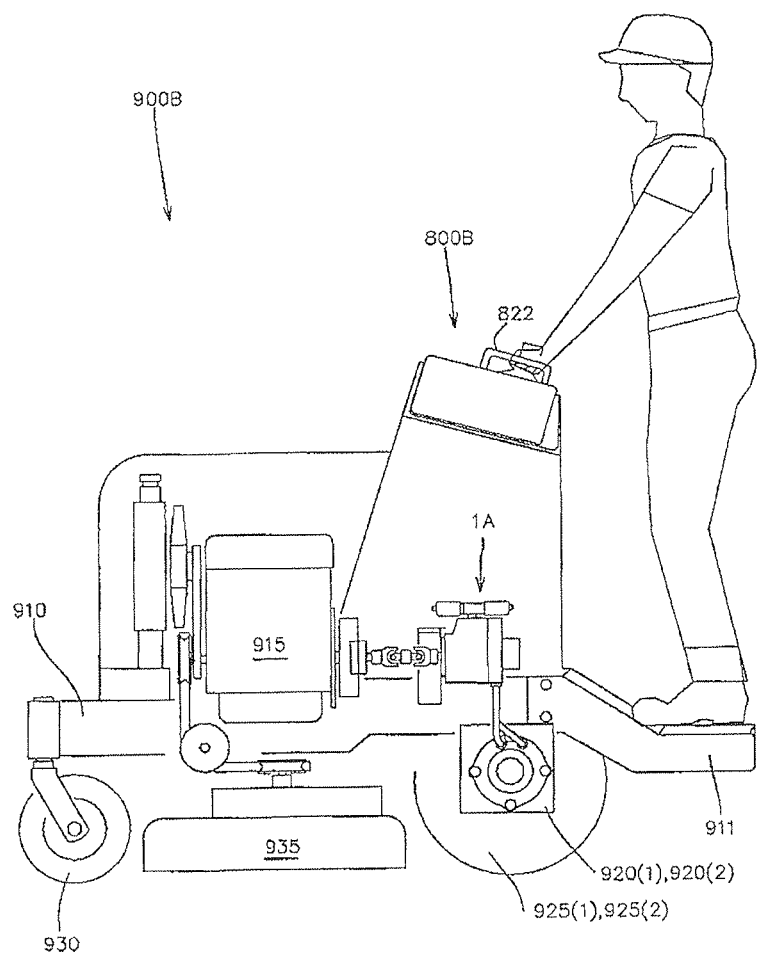
FIG. 14 is a side view of a second example of the working vehicle to which the hydraulic actuator unit according to the present invention could be applied.

FIG. 14 is a side view of a working vehicle 900B according to a second example.

In the drawings, the members same as those in the working vehicle 900A according to the first example are denoted by the same reference numerals to omit detailed description thereof.

The working vehicle 900B according to the second example is different from the working vehicle 900A according to the first example in that the operation unit 800A is replaced by an operation unit 800B that is detachably connected to the vehicle frame 910.

Figure 15A:
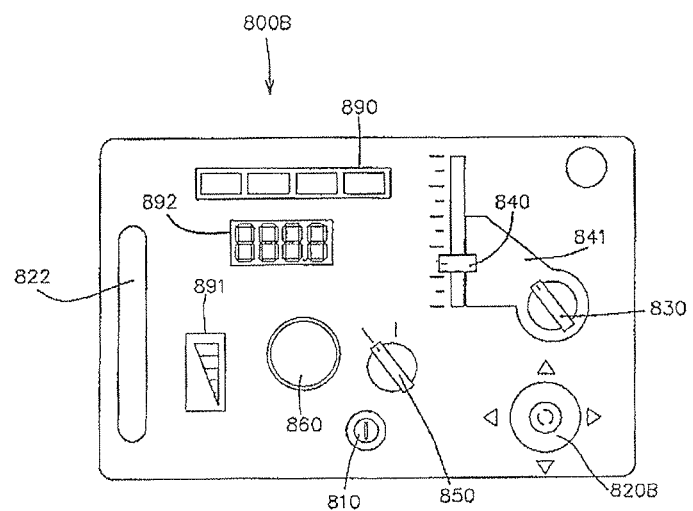
FIGS. 15A and 15B are schematic front and side views of an operation unit included in the working vehicle according to the second example, respectively.
Figure 15B:
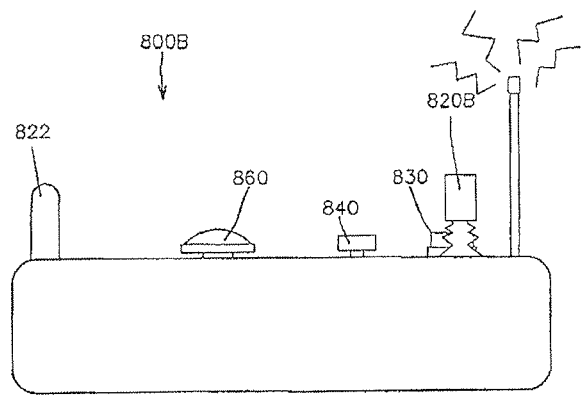

FIGS. 15A and 15B are schematic front and side views of the operation unit 800B, respectively.

The operation unit 800B is different from the operation unit 800A in that the first and second speed change operating members 820(1) and 820(2) are replaced by a single speed change operating member 820B.

More specifically, the operation unit 800B includes the key operation input portion 810, the single speed change operating member 820B, the mower on/off member 830, the maximum-speed setting member 840 and the emergency stop member 860.

FIG. 15A also shows an indicator 892 for displaying vehicle traveling speed.

FIGS. 15A and 15B also show a grip bar 822 that the driver can grip.

The single speed change operating member 820B is in the form of a joy-stick capable of being slanted in a fore-and-aft direction and a lateral direction, as shown in FIG. 15B.

The working vehicle 900B according to the second example is provided with a single speed change operating-side sensor (not shown) in place of the first and second speed change operating-side sensors 825(1) and 825(2).

The single speed change operating-side sensor is configured to detect the position of the operated single speed change operating member 820B (the position in the fore-and-aft direction as well as in the lateral direction).

The control unit 500 controls the travel speed of the working vehicle 900B on the basis of the position in the fore-and-aft direction of the operated speed change operating member 820B as well as controls left or right turn made by the working vehicle 900B on the basis of the position in the lateral direction of the speed change operating member 820B.

More specifically, the control unit 500 calculates, on the basis of a signal from the speed change operating-side sensor, a reference actuation amount by which each of the first and second electric motors 50(1) and 50(2) is actuated by an identical amount in an identical direction in accordance with the position in the fore-and-aft direction of the operated speed change operating member 820B. The control unit 500 also calculates an actuation increase-decrease amount of each of the first and second electric motors 50(1) and 50(2) in accordance with the position in the lateral direction of the operated speed change operating member 820B. The control unit 500 controls to actuate each of the first and second electric motors 50(1) and 50(2) by each actuation amount that is calculated from the reference actuation amount and the actuation increase-decrease amount.

For example, in a case where the speed change operating member 820B is operated left and forward, the control unit 500 calculates the reference actuation amount in accordance with the amount of forward operation of the speed change operating member 820B as well as calculates the actuation increase-decrease amount in accordance with the amount of leftward operation of the speed change operating member 820B. The control unit 500 then outputs a control signal of an actuation amount obtained by subtracting the actuation increase-decrease amount from the reference actuation amount, to one of the first and second electric motors 50(1) and 50(2) corresponding to the left driving wheel 925. The control unit 500 also outputs a control signal of an actuation amount obtained by adding the actuation increase-decrease amount to the reference actuation amount to the other one of the electric motors 50 corresponding the right driving wheel 925. As a result, the working vehicle 900B turns left while traveling forward.

In a case where the speed change operating member 820B is operated to the left in the center in the fore-and-aft direction, the reference actuation amount is made equal to zero. The control unit 500 thus actuates one of the electric motors 50 corresponding to the left driving wheel 925 in the reverse-rotation direction by an amount corresponding to the actuation increase-decrease amount, as well as actuates the other one of the electric motors 50 corresponding to the right driving wheel 925 in the normal-rotation direction by an amount corresponding to the actuation increase-decrease amount. As a result, the working vehicle 900B makes a zero turn in a leftward direction.

The above explained various operating members are of course electrically connected to the control unit 500 by wireless.

Figure 16A:
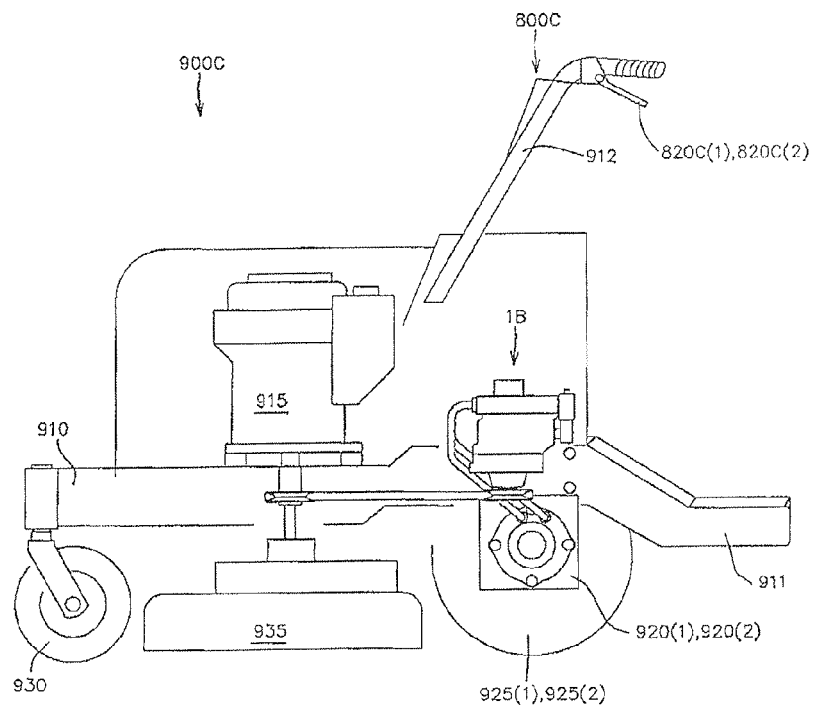
FIG. 16A is a side view of a third example of the working vehicle to which the hydraulic actuator unit according to the present invention could be applied.

FIG. 16A is a side view of a working vehicle 900C according to a third example.

Figure 16B:
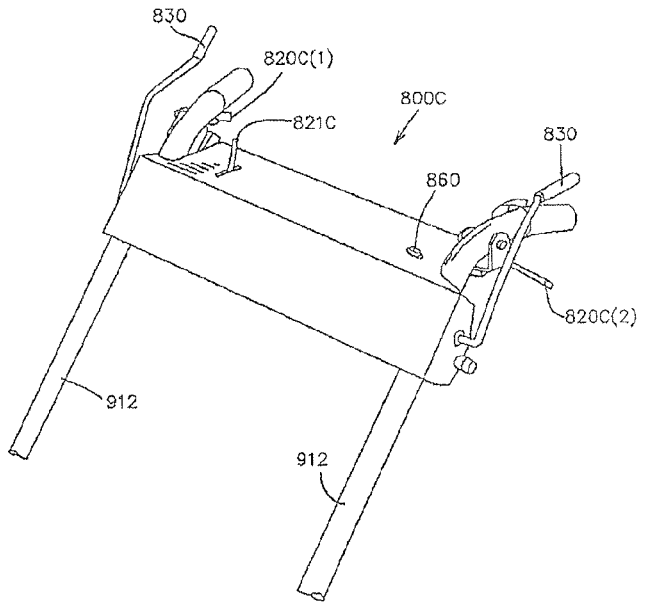
FIG. 16B is a perspective view of an operation unit included in the working vehicle according to the third example.

FIG. 16B is a perspective view of an operation unit 800C in the working vehicle 900C.

In the drawings, the members identical with those of the working vehicles 900A and 900B according to the first and second examples are denoted by the identical reference numerals and detailed description thereof will not be repeatedly provided.

As shown in FIG. 16A, in the working vehicle 900C according to the third example, the engine 915 is of a vertical type in which its output shaft extends in a vertical direction.

The working vehicle 900C according to the third example includes a pair of right and left handle rods 912 that have proximal ends supported by the vehicle frame 910 and free ends functioning as grip ends capable of being gripped by a driver, and the operation unit 800C mounted to the pair of handle rods 912 in such a manner as to be positioned in the vicinity of the free ends of the handle rods 912.

The operation unit 800C includes first and second speed change operating members 820C(1) and 820C(2) that set only the respective operation amounts of the first and second variable displacement mechanisms 40(1) and 40(2), an output direction switching member 821 C for switching the actuation directions of the first and second variable displacement mechanisms 40(1) and 40(2) (the slanted direction of the movable swash plates 42 in the hydraulic actuator unit 1 A according to the present embodiment), the mower on/off member 830 and the emergency stop member 860.

The first and second speed change operating members 820C(1) and 820C(2) are in the form of a swing arm capable of being rotated around respective rotational axis lines along the vehicle width direction.

The working vehicle according to the third example is provided with first and second speed change operating amount sensors (not shown) that detect the operated positions (operated amounts) of the first and second speed change operating members 820C(1) and 820C(2), and an output direction sensor (not shown) that detects the operated position of the output direction switching member 821C, in place of the first and second speed change operating-side sensors 825(1) and 825(2) that detect both of the respective operated directions and operated amounts.

The control unit 500 actuates each of the first and second electric motors 50(1) and 50(2) by the amount according to a signal transmitted from each of the first and second speed change operation amount sensors in an actuation direction according to a signal transmitted from the output direction sensor.

In the working vehicle 900C according to the third example, the mower on/off member 830 is in the form of a deadman type clutch.

Specifically, the mower on/off member 830 is in the form of a lever capable of being rotated around a rotational axis line along the vehicle width direction so as to be positioned at a clutch engagement position and a clutch release position that are close to and away from the grip portion, and is pressed toward the clutch release position by a biasing member.

Figure 17:
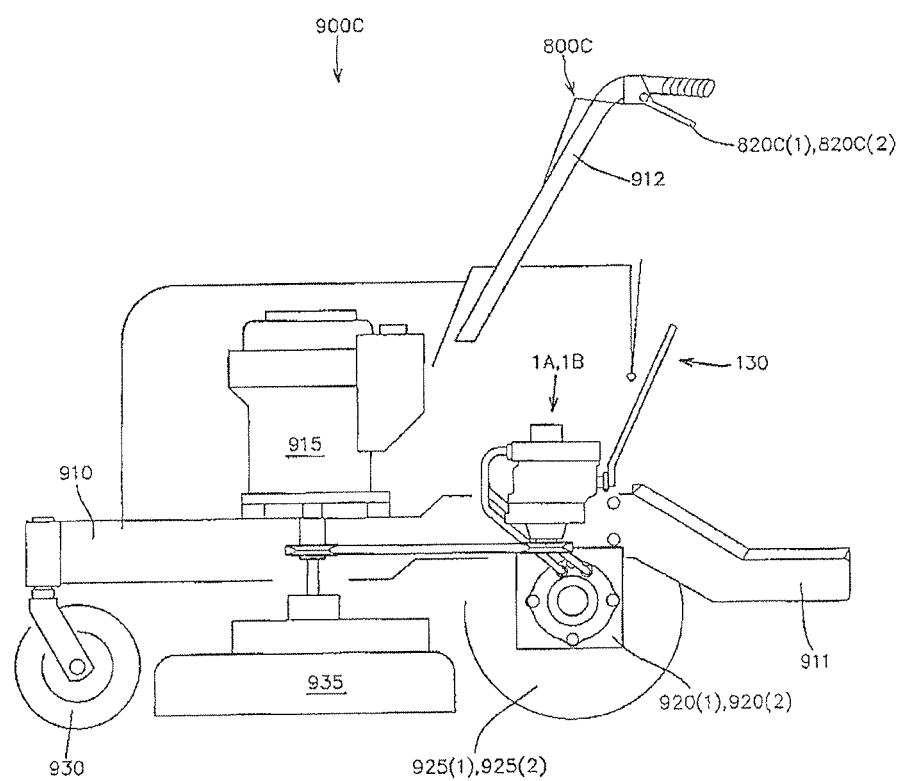
FIG. 17 is a side view of the working vehicle according to the third example in a state of being changed to a manual mode.

FIG. 17 is a side view of the working vehicle 900C according to the third example in a state of being changed to the manual mode.

As explained above, in order to change the hydraulic actuator unit from the electric mode to the manual mode, the electric motor cover 70 to which the electric motor 50 and the speed change actuating-side sensors 210 are connected is detached, and the operation rod 130 is mounted.

In the manual mode, the control unit 500 should be of course inhibited to control actuations of the electric motors 50 based on signals transmitted from the speed change operating-side sensors 825 and the speed change actuating-side sensors 210.

For example, the working vehicle may be provided with a mode change switch (not shown) which can be manually operated by a driver or an electric motor mount sensor (not shown) which detects whether or not each of the electric motors 50 is mounted, so that the control unit 500 can recognize a change into the manual mode on the basis of a signal from the mode change switch or the electric motor mount sensor.

Alternatively, the control unit 500 may be configured to recognize a change into the manual mode in a case where a signal of an abnormal value is transmitted from the speed change actuating-side sensor 210.

Figure 18A:
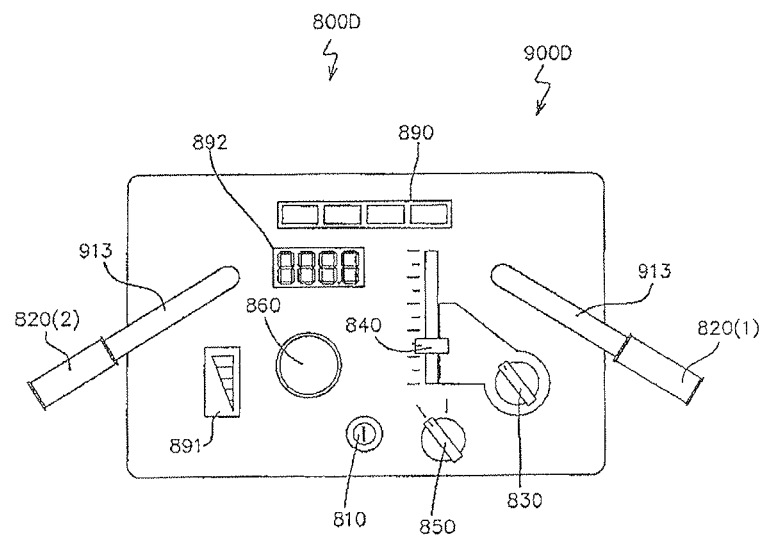
FIGS. 18A and 18B are front and side views of an operation unit of a fourth example of the working vehicle to which the hydraulic actuator unit according to the present invention could be applied, respectively.
Figure 18B:
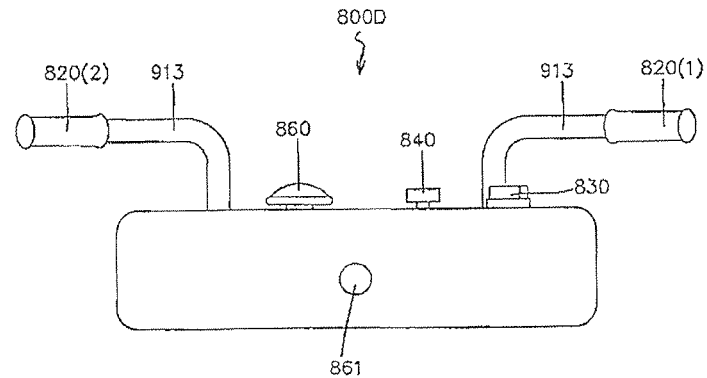

FIGS. 18A and 18B are front and side views of an operation unit 800D of a working vehicle 900D according to a fourth example, respectively.

In the drawings, the members identical with those of the working vehicles 900A to 900C according to the first to third examples are denoted by the identical reference numerals and detailed description thereof will not be repeatedly provided.

The working vehicle 900D according to the fourth example includes a pair of right and left handle bars 913 that have free ends functioning as grip portions, and the operation unit 800D is fixed in the vicinity of the free ends of the handle bars 913.

In the working vehicle 900D according to the fourth example, the first and second speed change operating members 820(1) and 820(2) are inserted around the pair of right and left handle portions in a rotatable about the axis lines, respectively. The first and second speed change operating-side sensors 825(1) and 825(2) are configured so as to detect both the rotational directions and the rotational amounts around the respective axis line of the first and second speed change operating members 820(1) and 820(2), respectively.

FIG. 18B also shows a second emergency stop member 861.

A second key is detachably mounted to the second emergency stop member 861. When the second key is detached from the second emergency stop member 861, the engine 915 is forcibly stopped and the main power supply of the working vehicle 900D is forcibly switched off.

For example, the second key is connected to the driver through a string-like member so that unintentional fall of the driver out of the working vehicle 900D causes the second key to be detached from the second emergency stop member 861.

Figure 19A:
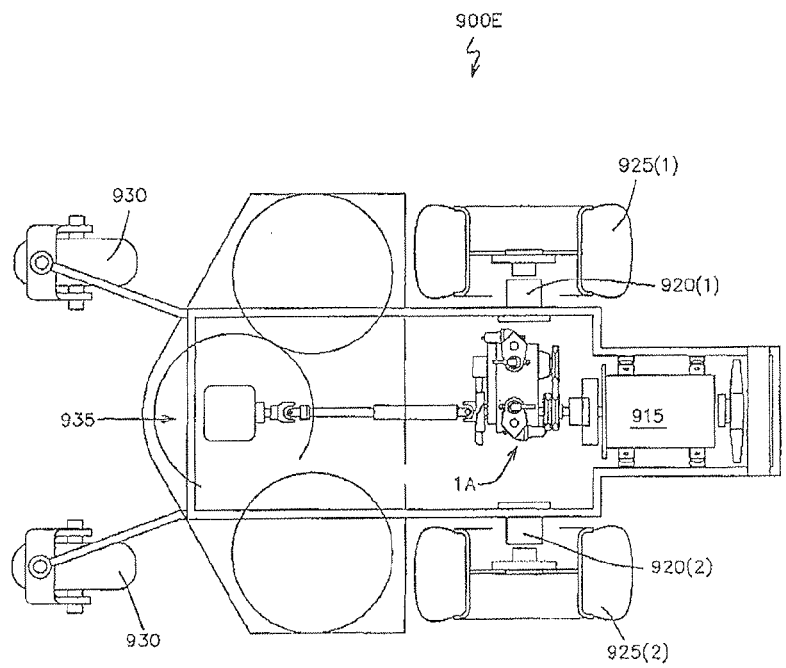
FIGS. 19A and 19B are plan and side views of a fifth example of the working vehicle to which the hydraulic actuator unit according to the present invention could be applied, respectively.
Figure 19B:
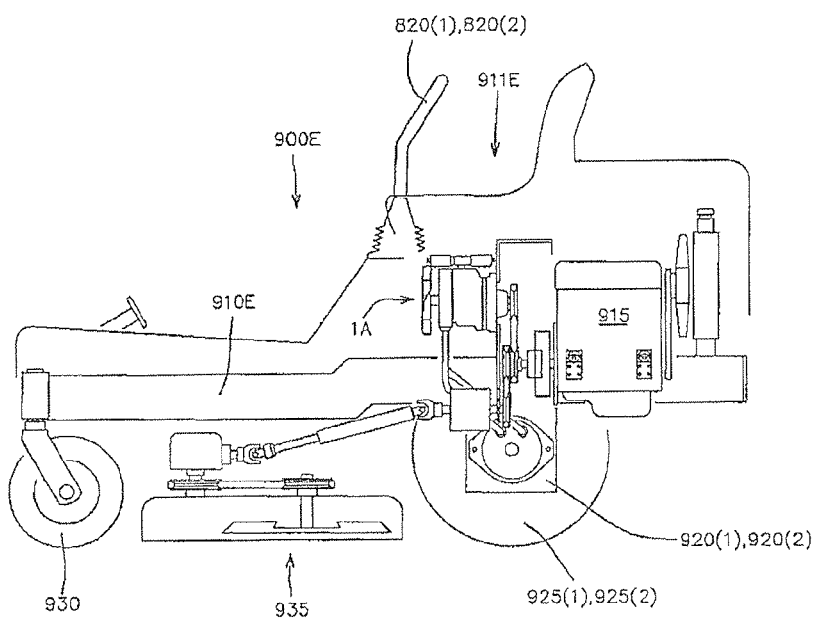

FIGS. 19A and 19B are plan and side views of a working vehicle 900E according to a fifth example, respectively.

In the drawings, the members identical with those of the working vehicles 900A to 900D according to the first to fourth examples are denoted by the identical reference numerals and detailed description thereof will not be repeatedly provided.

As shown in FIGS. 19A and 19B, the working vehicle 900E according to the fifth example includes a vehicle frame 910E with a driver's seat 911E, the engine 915, the hydraulic actuator unit 1A, the first wheel motor unit 920(1), the second wheel motor unit 920(2), the pair of left and right driving wheels 925(1) and 925(2), non-driving wheels 930 supported by the vehicle frame 910E, the mower unit 935, the first and second speed change operating members 820(1) and 820(2), the starter (not shown), the power generator unit (not shown), the battery (not shown), and the control unit (not shown).

In the working vehicle 900E according to the fifth example, the non-driving wheel is in the form of caster wheel, and the first and second speed change operating members 820(1) and 820(2) are in the form of lever rotated around a rotational axis line along the vehicle width direction.

Although the engine is in the form of horizontal type in the working vehicle 900E according to the fifth example, it is of course possible to adopt the vertical type engine.

Figure 20A:
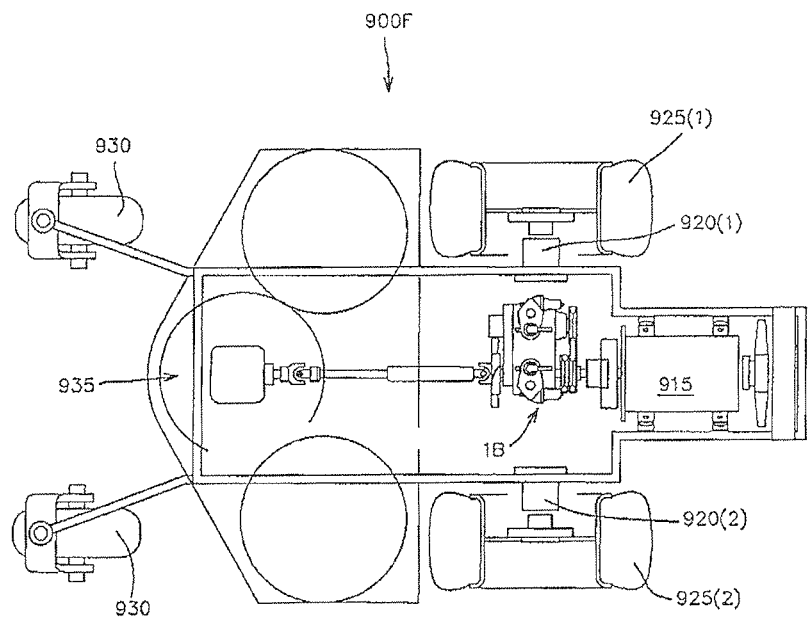
FIGS. 20A and 20B are plan and side views of a sixth example of the working vehicle to which the hydraulic actuator unit according to the present invention could be applied, respectively.
Figure 20B:
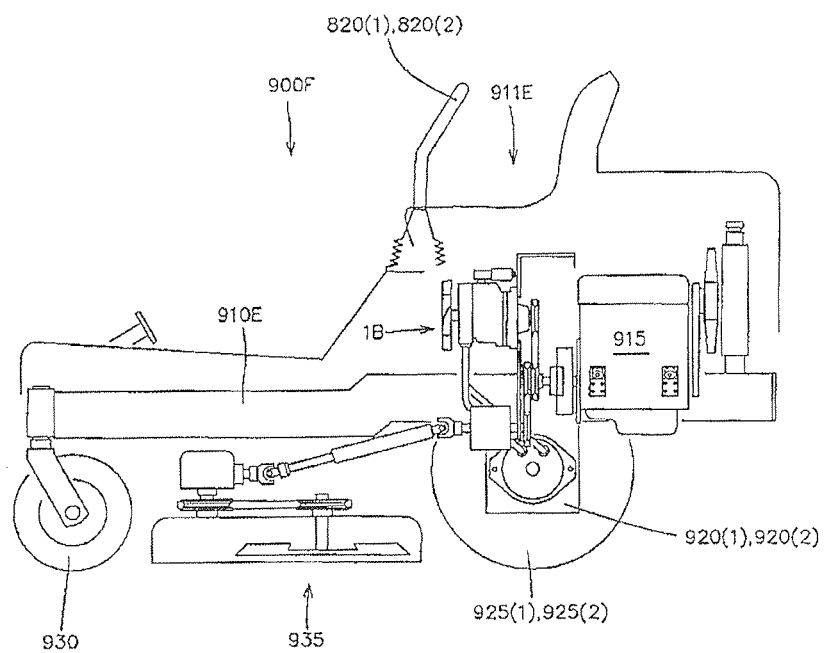

FIGS. 20A and 20B are plan and side views of a working vehicle 900F according to a sixth example, respectively.

In the drawings, the members identical with those of the working vehicles 900A to 900E according to the first to fifth examples are denoted by the identical reference numerals and detailed description thereof will not be repeatedly provided.

The working vehicle 900F according to the sixth example is different from the working vehicle 900E according to the fifth example in that the hydraulic actuator unit 1A is replaced by the hydraulic actuator unit 1B according to the modified example.

Figure 21:
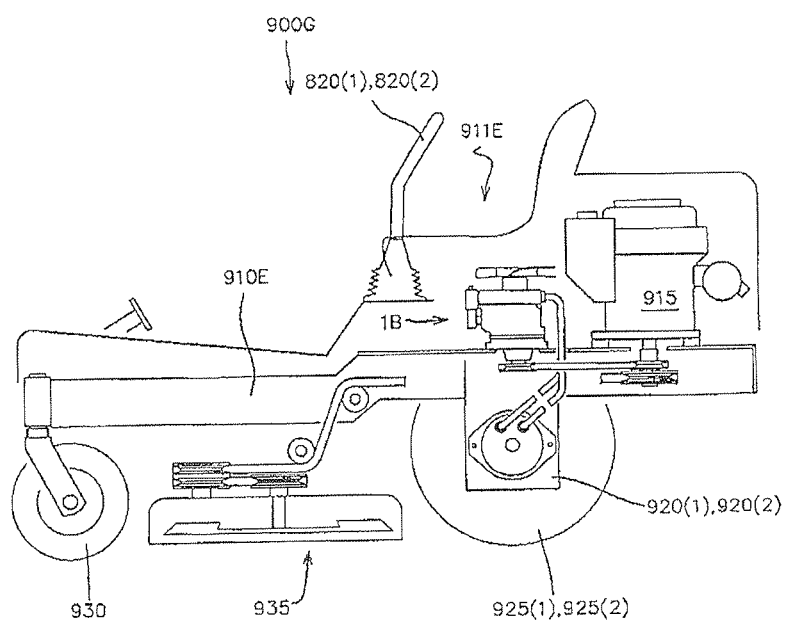
FIG. 21 is a side view of a seventh example of the working vehicle to which the hydraulic actuator unit according to the present invention could be applied.

FIG. 21 is a side view of a working vehicle 900G according to a seventh example.

In the drawing, the members identical with those of the working vehicles 900A to 900F according to the first to sixth examples are denoted by the identical reference numerals and detailed description thereof will not be repeatedly provided.

The working vehicle 900G according to the seventh example is different from the working vehicle 900F according to the sixth example in that the engine 915 is changed to the vertical type.

Figure 22:
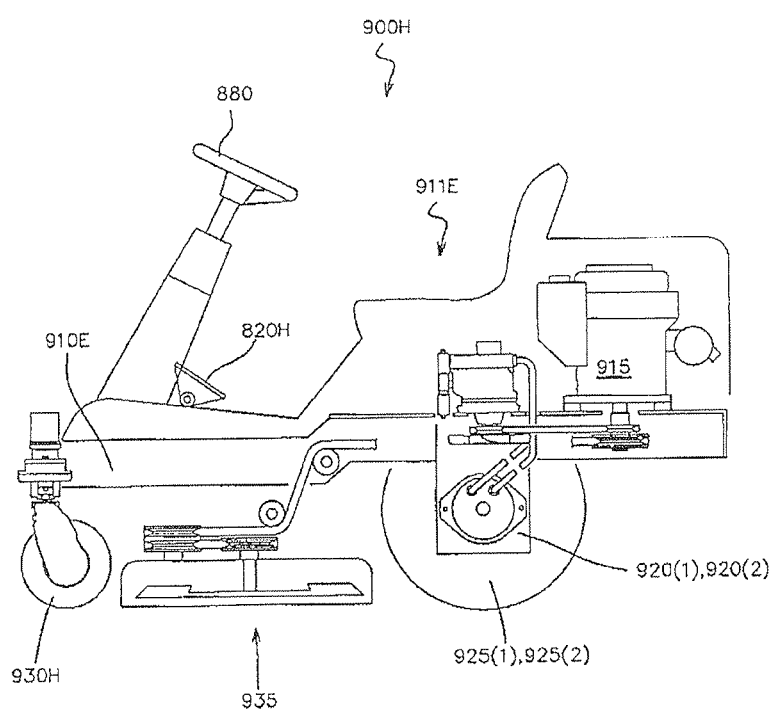
FIG. 22 is a side view of an eighth example of the working vehicle to which the hydraulic actuator unit according to the present invention could be applied.

FIG. 22 is a side view of a working vehicle 900H according to an eighth example.

In the drawing, the members identical with those of the working vehicles 900A to 900G according to the first to seventh examples are denoted by the identical reference numerals and detailed description thereof will not be repeatedly provided.

The working vehicle 900H according to the eighth example is different from the working vehicle 900E according to the fifth example in that the engine 915 is changed to the vertical type and the non-driving wheel 930 is changed to a steering wheel 930H that is steered by way of a steering wheel 880.

The working vehicle 900H according to the eighth example includes a speed change operating member 820H for changing both of traveling direction and traveling speed in place of the first and second speed change operating members 820, in comparison with the working vehicle according to the fifth example.

In the working vehicle 900H according to the eighth example, the control unit 500 is configured to generate a difference between the actuation amounts of the first and second electric motors 50(1) and 50(2) in accordance with the turning angle of the vehicle in order to compensate a difference in the turning radius between the pair of driving wheels 925(1) and 925(2).

Figure 23:
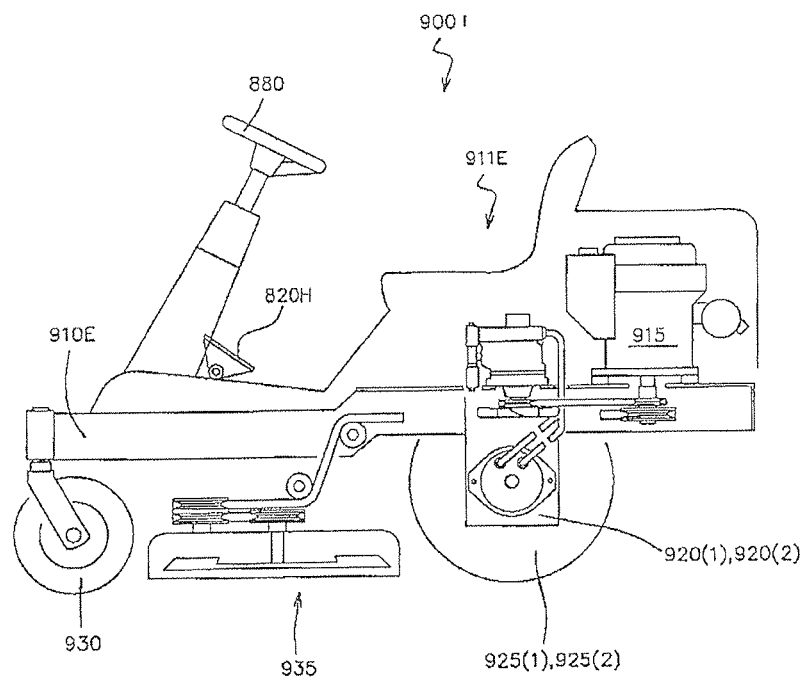
FIG. 23 is a side view of a ninth example of the working vehicle to which the hydraulic actuator unit according to the present invention could be applied.

FIG. 23 is a side view of a working vehicle 900I according to a ninth example.

In the drawing, the members identical with those of the working vehicles 900A to 900H according to the first to eighth examples are denoted by the identical reference numerals and detailed description thereof will not be repeatedly provided.

The working vehicle 9001 according to the ninth example is different from the working vehicle 900H according to the eighth example in that the non-driving wheel is changed to the caster wheel 930, In the working vehicle 9001 according to the ninth example, the control unit 500 generates a difference between the actuation amounts of the first and second electric motors 50(1), 50(2) in accordance with manual operation on the steering wheel 880 so that the working vehicle 9001 makes a turn.

The working vehicle 9001 according to the ninth example could make a zero turn by operating the steering wheel 880 in either right direction or left direction while operating the speed change operating member 820H at the neutral position.

Now, one example of a control program of the control device 500 in the working vehicle to which the hydraulic actuator unit 1A according to the present embodiment is applied will be explained.

Figure 24:
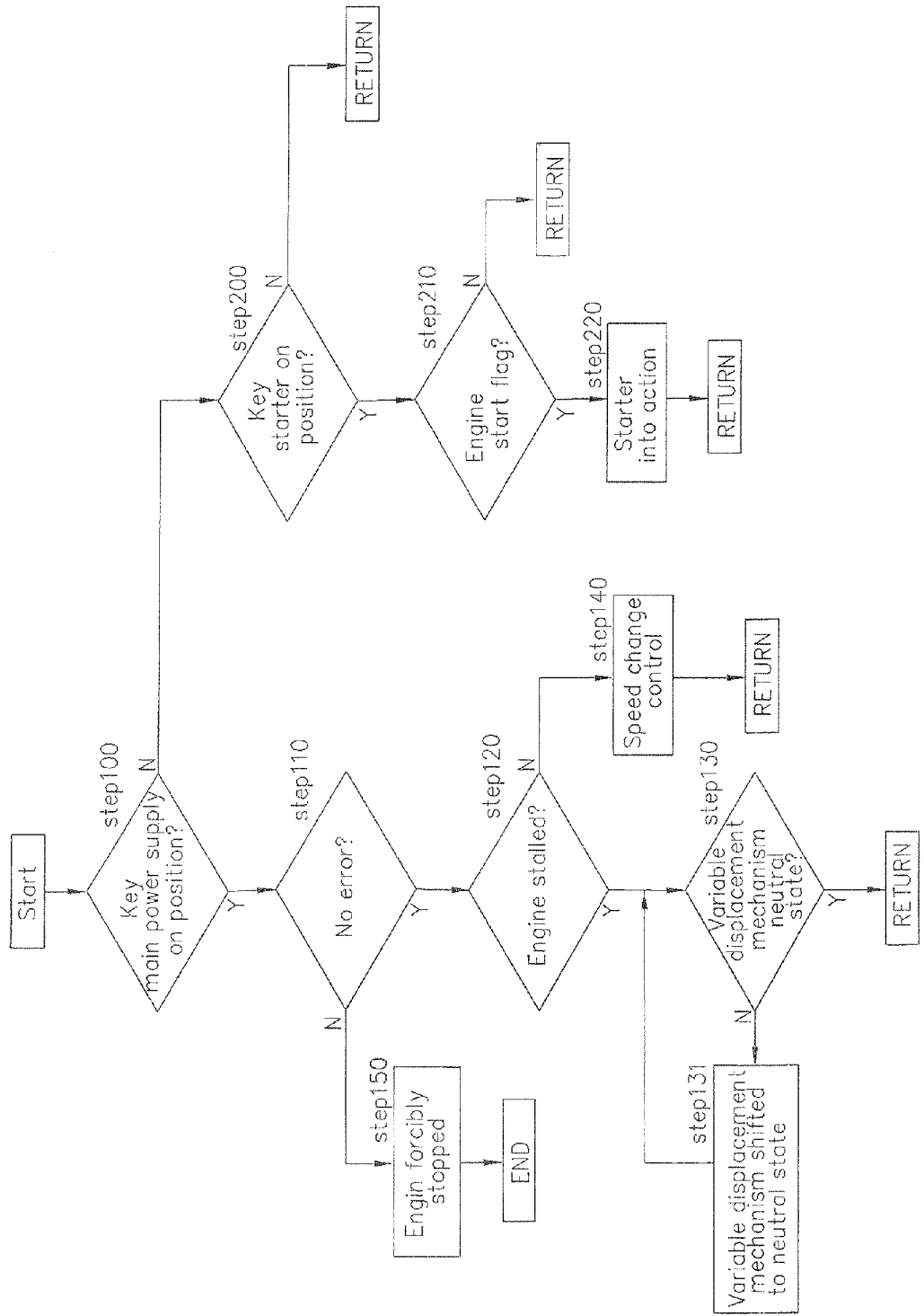
FIG. 24 is a flowchart of a control program of the control device.

FIG. 24 is a flowchart of the control program according to the example.

The control program starts in response to a motion in which the key is operated to the main power supply on position so that the working vehicle is in a main power supply on state.

The control unit 500 determines in step 100 whether or not the key is located at the main power supply on position, and proceeds to step 110 if YES while proceeding to step 200 if NO.

The control unit 500 determines in step 200 whether or not the key is located at the starter on position, and proceeds to step 210 if YES while returning to step 100 if NO.

The control unit 500 determines in the step 210 whether or not the engine 915 can be turned over.

Figure 25:
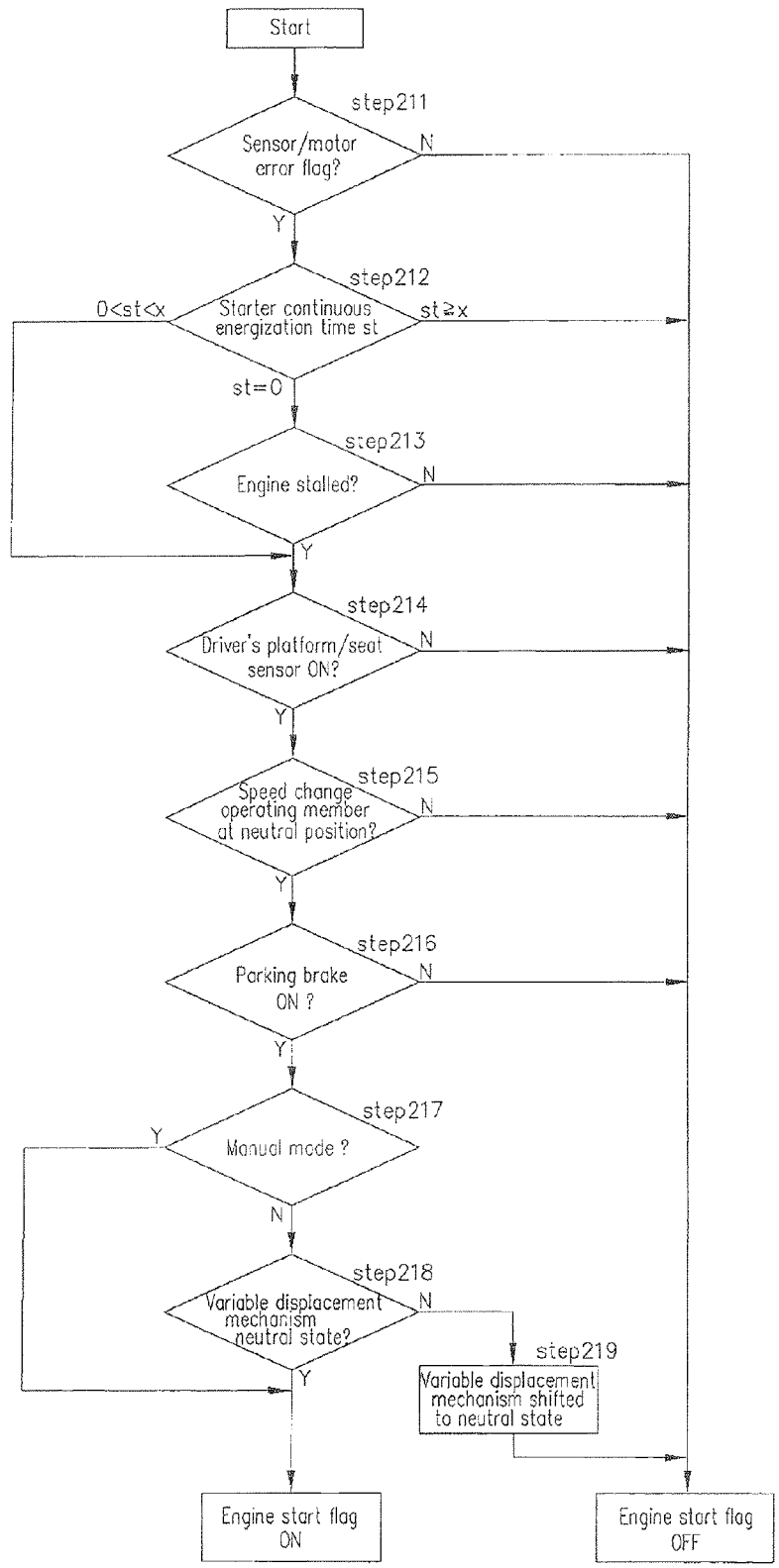
FIG. 25 is a flowchart of an engine start program included in the control program.

This determination may be made in accordance with an engine start program described in FIG. 25, for example.

More specifically, in a case where all the following conditions are satisfied, the control unit 500 turns on an engine start flag and proceeds to step 220. On the other hand, in a case where any one of the conditions is not satisfied, the control unit 500 turns off the engine start flag and proceeds to step 230. The above conditions are that there is no trouble in the various sensors as well as in the electric motors 50 (step 211), that a driver is riding on the driver's platform 911 or on the driver's seat 911E (step 214), that each of the speed change operating members 820 is located at the neutral position (step 215), that each of the variable displacement mechanisms 40 is in the neutral state (step 218), and that a parking brake provided to the working vehicle is being actuated (step 216).

Whether or not the driver is riding on either one of the driver's platform 911 and the driver's seat 911E is determined on the basis of a signal transmitted from a driver's platform/seat sensor 870 (see FIG. 13) which is included in the working vehicle.

The control unit 500 determines in the step 218 whether or not each of the variable displacement mechanisms 40 is in the neutral state on the basis of a signal from each of the speed change operating members 820. However, no signal is received from the speed change operating members 820 in the manual mode. Then, the determination made in the step 218 always results in NO, and the engine cannot be started in the manual mode.

In view of the above problem, the engine start program includes, prior to the step 218, step 217 of determining whether or not the manual mode is currently selected.

More specifically, the control unit 500 is configured to bypass the step 218 and to turn on the engine start flag if YES in the step 217 (namely, in the manual mode).

Furthermore, the engine start program is configured to turn off the engine start flag in a case where the engine 915 is not started despite the fact that the starter 916 has been driven for a predetermined period.

More specifically, the engine start program includes step 212 of turning off the engine start flag in a case where a period st of continuously energizing the starter 916 exceeds a predetermined period x.

In order to prevent the starter 916 from being driven when the key is erroneously operated to the starter on position with the engine 915 being driven, it is determined in the step 212 whether the period st of continuously energizing the starter 916 satisfies st=0, 0<st<x, or x≦st.

In the case where st =0 is satisfied in the step 212, the control unit 500 proceeds to step 213 of determining whether or not the engine 915 is stopped.

The control unit 500 then turns on the engine start flag if YES in the step 213 as well as if the remaining engine start conditions are satisfied, while turning off the engine start flag if NO in the step 213.

More specifically, in a case where the engine 915 is being stopped and the key is operated to the starter on position, the control unit 500 determines that st=0 is satisfied in the step 212 and proceeds to the step 213. Since the engine 915 is being stopped in this case, the control unit 500 turns on the engine start flag if the remaining engine start conditions are satisfied.

To the contrary, in a case where the key is erroneously operated to the starter on position with the engine 915 being driven, the control unit 500 determines NO in the step 213 and turns off the engine start flag.

Furthermore, in the case where 0<st<x is satisfied in the step 212, the engine start program bypasses the step 213 and turns on the engine start flag if the remaining engine start conditions are satisfied.

This arrangement is made to prevent the engine start flag from being turned off in accordance with the determination in the step 213 while the engine 915 is being started up by the starter 916.

If YES in the step 210, the control unit 500 drives the starter to start the engine in step 220.

If NO in the step 210, the program returns to START.

If YES in the step 110 (in a case where the engine 915 is being driven and the working vehicle is traveling), the control unit 500 proceeds to step 110.

The control unit 500 determines in the step 110 whether or not there is caused any error.

Figure 26:
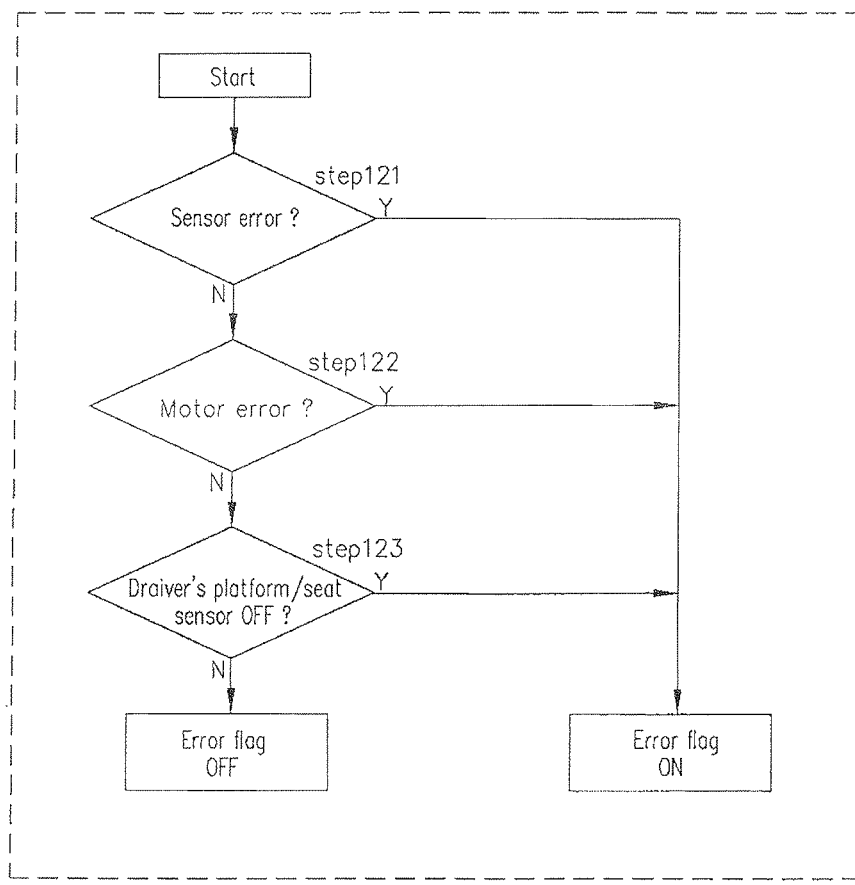
FIG. 26 is a flowchart of an error detection program included in the control program.

This determination may be performed by an error detection program described in FIG. 26, for example.

In a case where all the following conditions are satisfied, namely, that there is no trouble in the various sensors (step 111), that there is no trouble in the electric motors 50 (step 112), and that a driver is riding on the driver's platform 911 or on the driver's seat 911E (step 113), the error detection program turns off an error occurrence flag and proceeds to step 120. On the other hand, if any one of the above conditions is not satisfied, the error detection program turns on the error occurrence flag and proceeds to step 150.

If NO in the step 110 (namely, in a case where there is caused an error), the control unit 500 forcibly stops to drive the engine 915 in step 150.

If YES in the step 110 (namely, in a case where there is caused no error), the control unit 500 determines in step 120 whether or not the engine 915 is stopped.

The step 120 is provided to check whether or not the engine 915 is stalled due to some reason.

If NO in the step 120 (namely, in a case where the engine 915 is being properly driven), the control unit 500 proceeds to step 140 and controls to actuate the electric motors 50 in accordance with manual operation of the speed change operating members 820 so as to actuate the variable displacement mechanisms 40.

On the other hand, if YES in the step 120 (namely, in a case where the engine is being stalled), the control unit 500 actuates the electric motors 50 so as to bring the variable displacement mechanisms 40 into the neutral states.

More specifically, the control unit 500 determines in step 130 whether or not the variable displacement mechanisms 40 are in the neutral state, and returns to START if YES in the step 130. On the other hand, if NO in the step 130, the control unit 500 proceeds to step 131, actuates the electric motors 50 so as to bring the variable displacement mechanisms 40 into the neutral states, and then returns to START.

The control unit 500 preferably actuates each of the electric motors 50 at a top actuating speed in the step 131.

The present embodiment exemplifies the hydraulic actuator unit 1A that is formed as the hydraulic pump unit including the first and second hydraulic pump main bodies 10(1) and 10(2). However, the hydraulic actuator unit according to the present invention is of course not to be limited to the above.

Specifically, the hydraulic actuator unit according to the present invention can be embodied as a hydraulic pump unit including only a single hydraulic pump main body of the variable displacement type, a hydraulic motor unit including one or a plurality of variable displacement type hydraulic motor main bodies, or an HST unit including a hydraulic pump main body and a hydraulic motor main body at least one of which is of the variable displacement type.

Second Embodiment

Hereinafter, another embodiment of the hydraulic actuator unit according to the present application will be explained with reference to the accompanying drawings.

Figure 27:
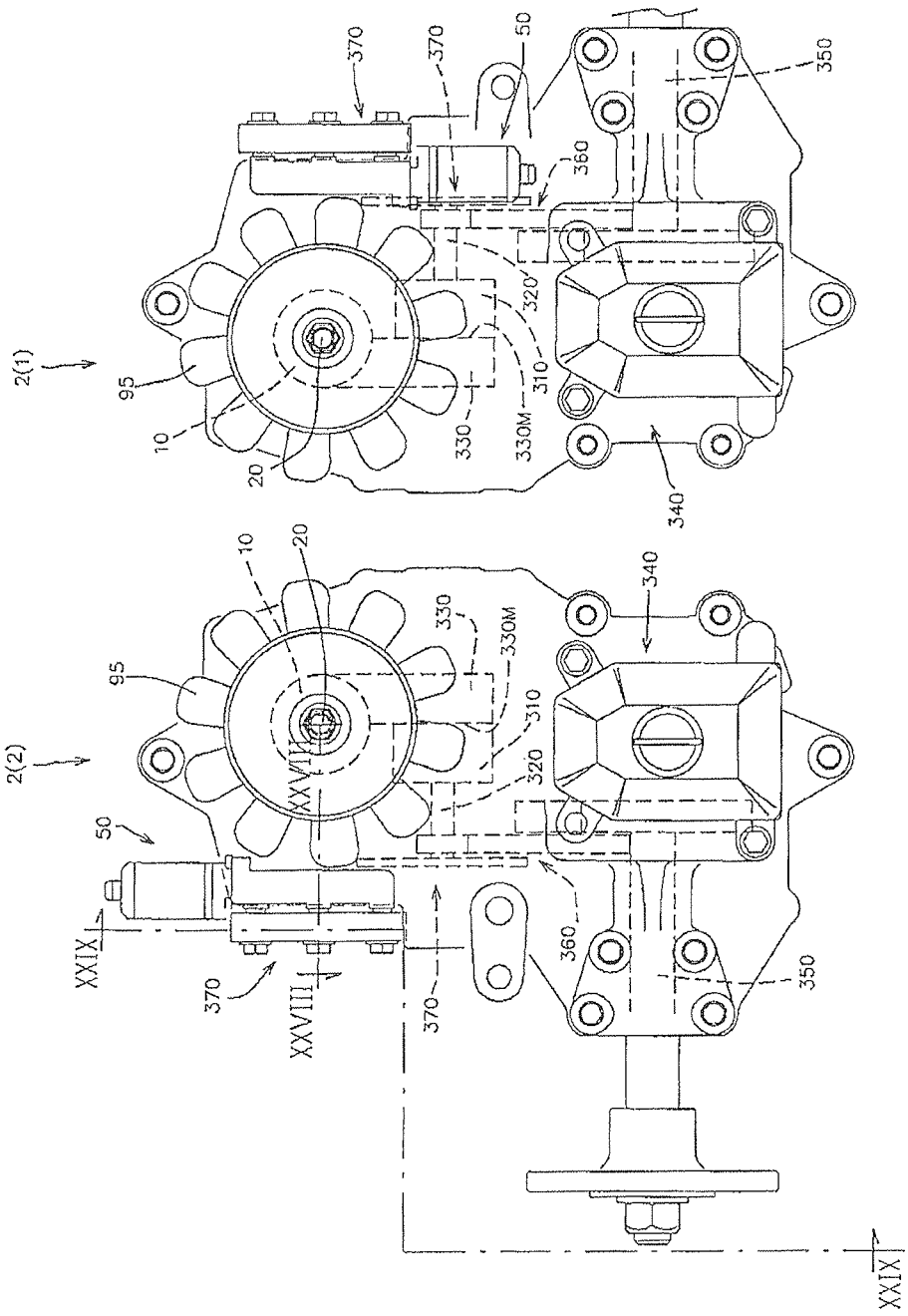
FIG. 27 is a plan view of a hydraulic actuator unit according to a second embodiment of the present invention.

FIG. 27 is a plan view of a hydraulic actuator unit 2 according to the present embodiment.

Figure 28:
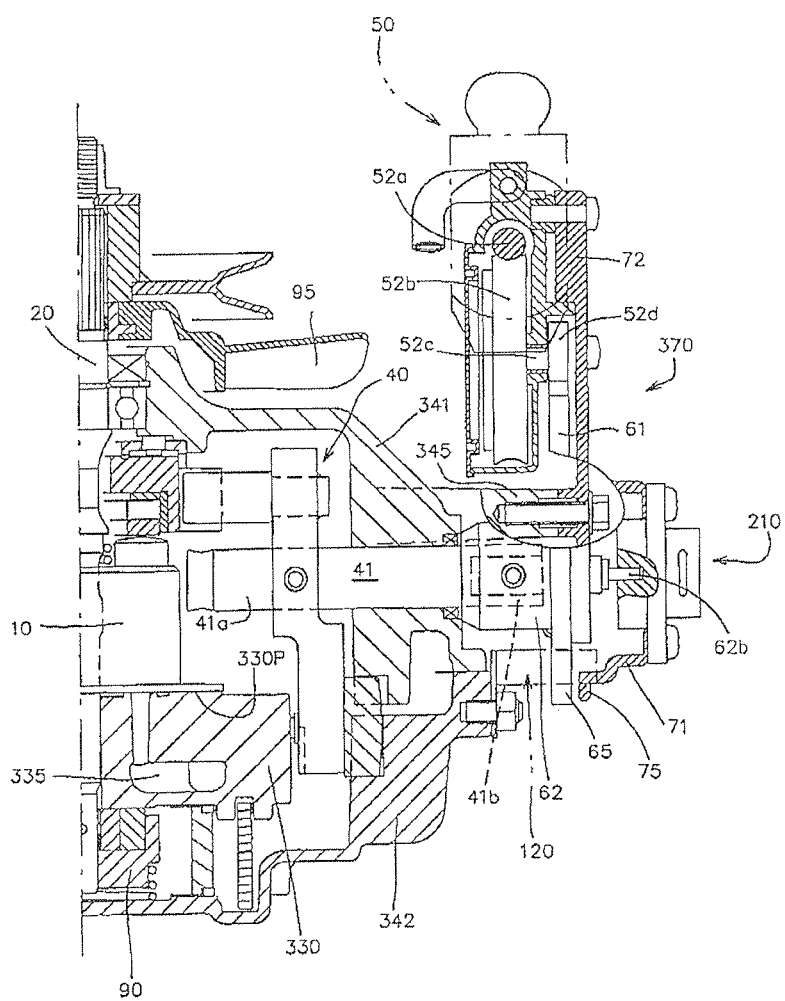
FIG. 28 is a cross sectional view taken along line XXVIII-XXVIII in FIG. 27.
Figure 29:
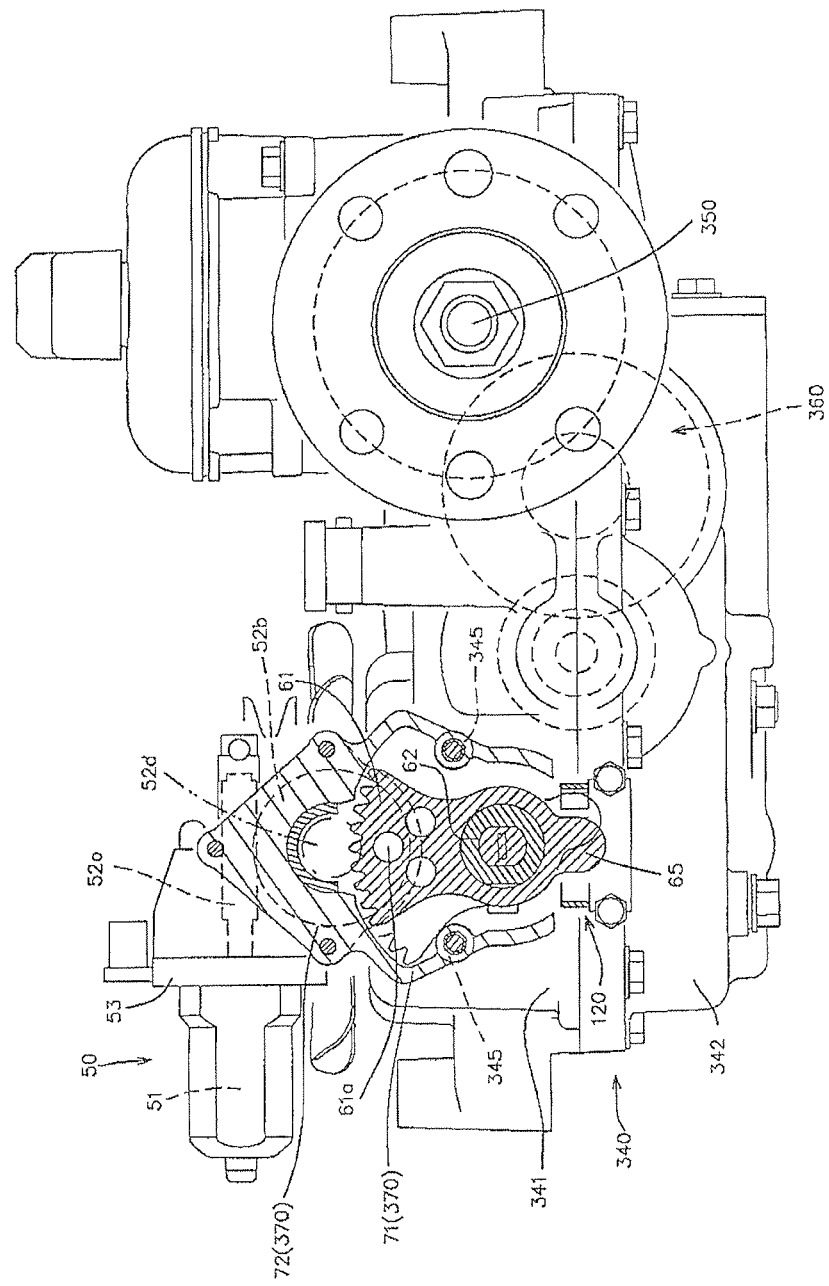
FIG. 29 is a cross sectional view taken along line XXIX-XXIX in FIG. 27.

FIGS. 28 and 29 are cross sectional views taken along lines XXVIII-XXVIII and XXIX-XXIX in FIG. 27, respectively.

In the drawings, the members same as those in the first embodiment are denoted by the same reference numerals to omit detailed description thereof.

As shown in FIGS. 27 to 29, the hydraulic actuator unit 2 according to the present embodiment is in the form of an axle driving device that integrally includes the hydraulic pump main body 10 of variable displacement type and a hydraulic motor main body 310 forming an HST in cooperation with the hydraulic pump main body 10.

The axle driving unit 2 is provided to each of the driving wheels of a working vehicle.

For example, as shown in FIG. 27, a working vehicle provided with a pair of right and left driving wheels includes a first axle driving unit 2(1) that is configured identically with the axle driving unit 2 and drives one of the pair of driving wheels, and a second axle driving unit 2(2) that is configured identically with the axle driving unit 2 and drives the other one of the pair of driving wheels.

As shown in FIGS. 27 to 29, the axle driving device 2 includes the pump shaft 20 operatively connected to the driving power source, the hydraulic pump main body 10 supported by the pump shaft 10 in a relatively non-rotatable manner with respect thereto, the variable displacement mechanism 40 changing the suction/discharge amount of the hydraulic pump main body 10, the hydraulic motor main body 310 fluidly connected to the hydraulic pump main body 10, a motor shaft 320 supporting the hydraulic motor main body 310 in a relatively non-rotatable manner with respect thereto, a center section 330, an axle case 340 accommodating the hydraulic pump main body 10, the hydraulic motor main body 310 and the center section 330, an output shaft 350 outputting rotational power, which has been operatively transmitted from the motor shaft 320, toward the corresponding driving wheel, the electric motor 50, an electric motor cover 370 and the motor transmission mechanism 60. The center section has a pump surface 330P with which the hydraulic pump main body 10 is brought into contact in a sliding manner around the rotational axis line and a motor surface 330M with which the hydraulic motor main body 310 is brought into contact in a sliding manner around the rotational axis line, and is formed with a pair of HST operation fluid passages 335 that fluidly connects the hydraulic pump main body 10 and the hydraulic motor main body 310. The electric motor cover 370 is configured so that the electric motor 50 is detachably mounted thereto, and could be detachably mounted to the axle case 340 with the electric motor 50 being mounted thereto.

In the present embodiment, the axle case 340 is provided with boss portions 345 so as to be positioned on both sides of the motor transmission mechanism 60. The electric motor cover 370 mounted to the boss portions 345 with the electric motor 50 being mounted thereto.

Specifically, the boss portions 345 are arranged around the operation shaft 62 in such a manner as to allow the sector gear 61 and the engagement arm 65 to extend radially outward with the operation shaft 62 as a reference.

In the present embodiment, as shown in FIG. 29, the boss portions 345 are located on both sides of the operation shaft 62.

The electric motor cover 370 includes the motor transmission mechanism cover portion 71, the electric motor mount portion 72 and the connection portion 73. The electric motor cover 370 is detachably mounted to the axle case 340 through connection of the connection portion 73 to the boss portions 345 by fastening members 79 such as bolts (see FIG. 28).

Specifically, the electric motor cover 370 is substantially different from the electric motor covers 70 only in that the side wall portion 74 is deleted.

The axle case 340 includes an upper housing 341 and a lower housing 342 that are connected to each other in a separable manner along au up-and-down direction.

The pump shaft 20 is supported by the upper and lower housings 341 and 342 in a rotatable manner around the axis line along the vertical direction with its upper end being extended upward from the upper housing 341.

The upper end of the pump shaft 20 functions as the input end that is operatively connected the driving power source.

In the present embodiment, the cooling fan is supported on the upper end of the pump shaft 20.

The center section 330 is accommodated in the axle case 340 in such a manner as that the pump surface 330P faces upward and the motor surface 330M faces toward the corresponding driving wheel.

The variable displacement mechanism 40 includes the control shaft 41 and the movable swash plate 42, as shown in FIG. 28.

The control shaft 41 is supported by the axle case 340 (the upper housing 341 in the present embodiment) in a rotatable manner around the axis line along a substantially horizontal direction in a state where the first end 41a is extended into the axle case 340 and the second ends is extended outward from the axle case 340.

In the present embodiment, the axle driving device is further provided with a speed-reduction gear mechanism 360 that reduces rotational speed of the rotational power output by the motor shaft 320 and transmits the rotational power whose rotational speed has been reduced to the output shaft 350, a brake mechanism 370 capable of selectively applying brake power to the motor shaft 320, and the charge pump 90 that is operatively driven by the pump shaft 20.

The invention claimed is:

1. A hydraulic actuator unit comprising a pump case, first and second pump shafts that are supported by the pump case in a rotatable manner around respective axis lines in a state of being positioned in parallel to each other and being operatively connected to each other, first and second hydraulic pump main bodies that are accommodated in the pump case in a state of being supported by the first and second pump shafts respectively in a relatively non-rotatable manner with respect thereto, first and second variable displacement mechanisms that change displacements of the first and second hydraulic pump main bodies, respectively, and first and second electric motors that actuate the first and second variable displacement mechanisms, respectively, the hydraulic actuator unit being characterized in that, the first pump shaft has first and second ends positioned on one and the other sides in its axis line direction, the first end being extended outward from the pump case to form an input end that is operatively connected to a driving power source, the second pump shaft has first and second ends that are positioned on the same side as the first and second ends of the first pump shaft in the axis line direction, the second end being extended outward from the pump case to drive a cooling fan, the first and second variable displacement mechanisms include first and second movable swash plates each of which changes a displacement of the corresponding hydraulic pump main body in accordance with its slanting position around a swing axis line, and first and second control shafts each of which is supported by the pump case in a rotatable manner around its axis line, each of the first and second control shafts has a first end operatively connected to the corresponding movable swash plate in such a manner as to slant the movable swash plate in accordance with its rotation around the axis line and a second end extended outward from the pump case, the first and second control shafts are supported by the pump case in such a manner as that they are orthogonal to the first and second pump shafts and their second ends are faced in the same direction to each other, each of the pair of electric motors has an electric motor main body that is controlled and driven based on an external electric signal, an electric motor output mechanism that is operatively connected to an output shaft of the electric motor main body, and an electric motor case that supports the electric motor main body and the electric motor output mechanism, the hydraulic actuator unit further includes a pair of electric motor covers for connecting the pair of electric motors to the pump case, one of the pair of electric motors is mounted to one of the pair of electric motor covers to form a first electric motor assembly that is detachably mounted to the pump case so as to rotate the first control shaft around the axis line, the other one of the pair of electric motors is mounted to the other one of the pair of electric motor covers to form a second electric motor assembly that is detachably mounted to the pump case so as to rotate the second control shaft around the axis line, the first electric motor assembly is mounted to the pump case so that the corresponding electric motor has a rotational axis line in parallel with the first pump shaft in a state where the electric motor is positioned on an opposite side to the second control shaft with respect to the first control shaft and is also positioned on an opposite side to the first end of the first pump shaft with respect to a virtual plane that passes through the axis lines of the first and second control shafts, and the second electric motor assembly is mounted to the pump case at a posture obtained by rotating the first electric motor assembly by 180 degrees about a virtual center line that is disposed in parallel with the first and second control shafts and is located at a center between the first and second control shafts, thereby the electric motor of the second electric motor assembly is positioned on an opposite side to the cooling fan with respect to the virtual plane.

2. A hydraulic actuator unit according to claim 1, further comprising a pair of first spring pieces for holding the first control shaft at a neutral position around the axis line, a first engagement arm that is directly or indirectly supported by the first control shaft in a relatively non-rotatable manner with respect thereto so as to be sandwiched by the pair of first spring pieces, a pair of second spring pieces for holding the second control shaft at a neutral position around the axis line, and a second engagement arm that is directly or indirectly supported by the second control shaft in a relatively non-rotatable manner with respect thereto so as to be sandwiched by the pair of second spring pieces, wherein the electric motor cover is provided with a prevention arm that pushes the corresponding pair of spring pieces apart from each other so that the corresponding engagement arm receives no influence from the pair of spring pieces upon mounting of the electric motor cover to the pump case.

3. A hydraulic actuator unit according to claim 2, wherein the pair of first spring pieces and the pair of second spring pieces are directly or indirectly mounted to the pump case so as to be positioned between the first and second control shafts.

4. A hydraulic actuator unit according to claim 3, further comprising a pair of sector gears that are supported by the corresponding control shafts in a relatively non-rotatable manner with respect thereto and are engaged with electric motor output gears of the corresponding electric motor output mechanisms, wherein the engagement arm is integrally formed with a member forming the corresponding sector gear.

5. A hydraulic actuator unit according to claim 1, wherein the electric motor output mechanism has a worm shaft that is operatively connected to the output shaft of the electric motor main body, a worm wheel that is engaged with the worm shaft, an electric motor output shaft that is supported by the electric motor case in a rotatable manner about its axis line and supports the worm wheel in a relatively non-rotatable manner with respect thereto, and an electric motor output gear that is supported by the electric motor output shaft in a relatively non-rotatable manner with respect thereto.

6. A hydraulic actuator unit according to claim 1, wherein each of the electric motors is provided with a clutch structure that has a reverse-rotation preventing function of preventing the electric motor main body from being rotated by power applied from the electric motor output gear of the electric motor output mechanism while allowing the electric motor output gear to be rotated in accordance with rotation of the electric motor main body.

7. A hydraulic actuator unit comprising a pump case, a pump shaft that is supported by the pump case in a rotatable manner around its axis line, a hydraulic pump main body that is accommodated in the pump case in a state of being supported by the pump shaft in a relatively non-rotatable manner with respect thereto, a variable displacement mechanism that changes a displacement of the hydraulic pump main body, and an electric motor that actuates the variable displacement mechanism, the hydraulic actuator unit being characterized in that,
  there is provided an electric motor cover to which the electric motor is mounted and which is detachably connected to the pump case with the electric motor being mounted thereto,
  there is provided a motor transmission mechanism that operatively connects an electric motor output gear of the electric motor to a control shaft of the variable displacement mechanism upon mounting of an electric motor assembly, which is formed by the electric motor and the electric motor cover, to the pump case,
  there are provided a pair of spring pieces that hold the control shaft at a neutral position around its axis line,
  there is provided an engagement arm that is directly or indirectly supported by the control shaft in a relatively non-rotatable manner with respect thereto so as to be sandwiched by the pair of spring pieces, and
  the electric motor cover is provided with a prevention arm that pushes the pair of spring pieces apart from each other so that the engagement arm receives no influence from the pair of spring pieces upon mounting of the electric motor cover to the pump case.

8. A hydraulic actuator unit according to claim 7,
  wherein the pump shaft includes first and second pump shafts that are arranged in parallel with each other and are operatively connected to each other, the hydraulic pump main body includes first and second hydraulic pump main bodies that are supported by the first and second pump shafts respectively in a relatively non-rotatable manner with respect thereto, the variable displacement mechanism includes first and second variable displacement mechanisms that change displacements of the first and second hydraulic pump main bodies, respectively, the electric motor includes first and second electric motors that have the same configuration to each other and actuate the first and second variable displacement mechanisms, respectively, the electric motor cover includes first and second electric motor covers that have the same configuration to each other and form first and second electric motor assemblies in cooperation with the first and second electric motors, respectively, the motor transmission mechanism includes first and second motor transmission mechanisms that have the same configuration to each other and operatively connect the electric motor output gears of the corresponding electric motors to the corresponding control shafts, respectively, the pair of spring pieces includes a pair of first spring pieces that hold a first control shaft of the first variable displacement mechanism at a neutral position around its axis line and a pair of second spring pieces that hold a second control shaft of the second variable displacement mechanism at a neutral position around its axis line, the engagement arm includes a first engagement arm that is directly or indirectly supported by the first control shaft in a relatively non-rotatable manner with respect thereto so as to be sandwiched by the pair of first spring pieces and a second engagement arm that is directly or indirectly supported by the second control shaft in a relatively non-rotatable manner with respect thereto so as to be sandwiched by the pair of second spring pieces, and the prevention arm includes a first prevention arm that is provided at the first electric motor cover so as to push the pair of first spring pieces apart from each other so that the first engagement arm receives no influence from the pair of first spring pieces upon mounting of the first electric motor cover to the pump case and a second prevention arm that is provided at the second electric motor cover so as to push the pair of second spring pieces apart from each other so that the second engagement arm receives no influence from the pair of second spring pieces upon mounting of the second electric motor cover to the pump case,
  wherein the first and second control shafts are supported by the pump case in a rotatable manner around the respective axis lines in a state where they are parallel to each other and their ends that are operatively connected to the corresponding electric motors face in the same direction to each other,
  wherein the first electric motor cover supports the first electric motor so as to be positioned on an opposite side to the second control shaft with respect to the first control shaft,
  wherein the second electric motor cover supports the second electric motor so as to be positioned on an opposite side to the first control shaft with respect to the second control shaft, and
  wherein the pair of first spring pieces and the pair of second spring pieces are positioned between the first and second control shafts.

9. A hydraulic actuator unit according to claim 8,
  wherein each of the first and second electric motors has an electric motor main body that is controlled and driven based on an external electric signal, an electric motor output mechanism that is operatively connected to an output shaft of the electric motor main body, and an electric motor case that supports the electric motor main body and the electric motor output mechanism, and
  wherein the electric motor output mechanism has a worm shaft that is operatively connected to the output shaft of the electric motor main body, a worm wheel that is engaged with the worm shaft, an electric motor output shaft that is supported by the electric motor case in a rotatable manner about its axis line and supports the worm wheel in a relatively non-rotatable manner with respect thereto, and an electric motor output gear that is supported by the electric motor output shaft in a relatively non-rotatable manner with respect thereto and is operatively connected to the motor transmission mechanism.

10. A hydraulic actuator unit according to claim 8, wherein each of the first and second electric motors has an electric motor main body that is controlled and driven based on an external electric signal, an electric motor output mechanism that is operatively connected to an output shaft of the electric motor main body, an electric motor case that supports the electric motor main body and the electric motor output mechanism, and a clutch structure that has a reverse-rotation preventing function of preventing the electric motor main body from being rotated by power applied from the electric motor output gear of the electric motor output mechanism while allowing the electric motor output gear to be rotated in accordance with rotation of the electric motor main body.

* * * * *